United States Patent [19]

Nakagawa et al.

[11] Patent Number: 5,291,282
[45] Date of Patent: Mar. 1, 1994

[54] IMAGE DATA CODING APPARATUS AND METHOD CAPABLE OF CONTROLLING AMOUNT OF CODES

[75] Inventors: Chihiro Nakagawa; Hidetoshi Yamada, both of Tokyo, Japan

[73] Assignee: Olympus Optical Co., Ltd., Tokyo, Japan

[21] Appl. No.: 771,791

[22] Filed: Oct. 4, 1991

Related U.S. Application Data

[63] Continuation-in-part of Ser. No. 680,698, Apr. 4, 1991.

[30] Foreign Application Priority Data

| | | | |
|---|---|---|---|
| Apr. 19, 1990 | [JP] | Japan | 2-101595 |
| Apr. 25, 1990 | [JP] | Japan | 2-107546 |
| Dec. 20, 1990 | [JP] | Japan | 2-404233 |

[51] Int. Cl.$^5$ .................................................. H04N 7/12
[52] U.S. Cl. ........................................ 348/384; 342/415
[58] Field of Search .................. 358/133, 136, 135; H04N 7/12

[56] References Cited

U.S. PATENT DOCUMENTS

| | | | |
|---|---|---|---|
| 4,780,761 | 10/1988 | Daly et al. | 358/133 |
| 4,831,439 | 5/1989 | Fedele et al. | 358/136 |
| 4,888,640 | 12/1989 | Acampora et al. | 358/133 |
| 4,894,713 | 1/1990 | Delogne et al. | 358/136 |
| 4,920,414 | 4/1990 | Remus et al. | 358/133 |
| 4,941,043 | 7/1990 | Jass | 358/133 |
| 5,023,482 | 6/1991 | Murakami et al. | 358/133 |
| 5,089,888 | 2/1992 | Zolepski et al. | 358/133 |

FOREIGN PATENT DOCUMENTS

63-286078 11/1988 Japan.
1-292987 11/1989 Japan.

OTHER PUBLICATIONS

IEEE Transactions On Communications, vol. Com-25, No. 11, Nov. 1977, by Wen-Hsiung Chen and C. Harrison Smith; "Adaptive Coding of Monochrome and Color Images", pp. 1285-1292.

*Primary Examiner*—James J. Groody
*Assistant Examiner*—Glenton Burgess
*Attorney, Agent, or Firm*—Frishauf, Holtz, Goodman & Woodward

[57] ABSTRACT

An image data coding apparatus includes a preprocessing unit for executing preprocessing including compression for input image data in units of screens to generate a preprocessed output. A quantizing unit quantizes the preprocessed output with a predetermined quantization width to generate a quantized output. A variable-length coding unit executes variable-length coding for the quantized output. A target-amount-of-codes output unit outputs information concerning a target amount of codes corresponding to one screen. A quantization width predicting unit predicts a suitable quantization width on the basis of the information from the variable-length coding unit to supply information concerning the predicted quantization width to the quantizing unit. The quantizing unit quantizes the preprocessed output generated by the preprocessing unit with the predicted quantization width included in the information from the quantization width predicting unit.

23 Claims, 10 Drawing Sheets

| 1 | 2 | 6 | 7 | 15 | 16 | 28 | 29 |
|---|---|---|---|---|---|---|---|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 54 | 56 | 61 |
| 22 | 35 | 38 | 48 | 51 | 57 | 60 | 62 |
| 36 | 37 | 49 | 50 | 58 | 59 | 63 | 64 |

FIG. 6

IMAGE DATA CODING APPARATUS AND METHOD CAPABLE OF CONTROLLING AMOUNT OF CODES

This application is a continuation-in-part of application Ser. No. 07/680,698, filed Apr. 4, 1991.

BACKGROUND OF THE INVENTION

1. Field of the Invention

The present invention relates to a coding apparatus and a coding method of executing high-efficiency coding to compress image data.

2. Description of the Related Art

In order to store image signals picked up by a solid-state image pickup apparatus, represented by a CCD (Charge Coupled Device), as digital data into a memory device such as a memory card or a magnetic disk, since a vast amount of data is involved, data of the obtained image signals must be subjected to some sort of compression to store many frame images within a limited recording capacity. For example, since a digital electronic still camera stores picked-up images as digital data into a data storage medium such as a memory card or a magnetic disk in place of a silver salt film, the number of images recordable on a single memory card or a magnetic disk drive must be assured.

Similarly, a digital VTR (video tape recorder), for example, is required to record a predetermined number of frames without being influenced by a data amount of images per frame. That is, image data of a necessary number of frames must be recorded regardless of whether the image is a still image or a motion image.

As an image data compressing method which satisfies these conditions, a coding method which is a combination of orthogonal transform coding and entropy coding is well known.

As a typical method of this type, a system currently being studied in the international standardization of a still image will be briefly described below.

In this system, image data is divided into blocks having a predetermined size, and two-dimensional DCT (Discrete Cosine Transform) is executed as orthogonal transform for each of the divided blocks. Subsequently, linear quantization corresponding to each frequency component is executed, and Huffman coding is executed as entropy (information amount per unit message) coding for the quantized value. At this time, a differential value between a DC component of one block and that of a nearby block is Huffman-coded. An AC component is subjected to so-called zigzag scanning from a low to high frequency component, and two-dimensional Huffman coding is executed in accordance with the number of consecutive invalid components (values being zero) and the value of the subsequent valid component. The processing described above is a basic portion of this system.

With this basic portion alone, however, no constant amount of codes can be obtained for each image because the Huffman coding as entropy coding is used.

The following system has therefore been proposed as a method of controlling an amount of codes. First, the processing of the above basic portion is executed and at the same time a total amount of codes generated on the entire screen is obtained. On the basis of this total amount of codes and a target amount of codes, a quantization width optimal for making the amount of codes approach the target amount of codes with respect to a DCT coefficient is predicted. The processing following the quantization of the basic portion is repeated by using the predicted quantization width. Subsequently, on the basis of a total amount of presently generated codes, the total amount of previously generated codes, and the target amount of codes, the optimal quantization width for making the amount of codes approach the target amount of codes is predicted again. If the predicted quantization width coincides with the previous quantization width and the total amount of presently generated codes is smaller than the target amount of codes, the processing is ended and codes are output. If otherwise, the above processing is repeated by using a new quantization width.

The above operation will be described in more detail below with reference to FIG. 1. First, as indicated by (a) in FIG. 1, one frame of image data (one frame of an image specified by the international standardization proposal is 720×576 pixels) is divided into blocks having a predetermined size (e.g., blocks A, B, C, . . . each consisting of 8×8 pixels). Subsequently, as indicated by (b) in FIG. 1, two-dimensional DCT (Discrete Cosine Transform) is executed as orthogonal transform for each of the divided blocks, and the resultant data is sequentially stored in an 8×8 matrix memory. The image data viewed from a two-dimensional point has a spatial frequency as frequency information based on a distribution of density data. When the DCT is executed as described above, therefore, the image data is transformed into a DC component DC and an AC component AC, and data indicating the DC component DC, a maximum frequency value of the AC component AC in the horizontal axial direction, a frequency value of the highest AC component AC in the vertical axial direction, and a maximum frequency value of the AC component AC in the oblique direction are stored in positions of the origin (0, 0), (0, 7), (7, 0), and (7, 7), respectively. At the middle position, frequency data in a direction having a correlation with the coordinate point is stored such that data with lower frequency sequentially appear from the origin side.

Subsequently, the data stored in each coordinate point is divided by a quantization width for each frequency component obtained by multiplying a predetermined quantized matrix by a quantization width coefficient α, thereby performing linear quantization (c). This quantized value is subjected to the Huffman coding as entropy coding. In this coding, a differential value between the DC component DC of one block and that of a nearby block is expressed by a group number (the number of added bits) and added bits, and the group number is Huffman-coded. The obtained coded words in combination with the added bits are taken as coding data (d1, d2, e1, and e2).

Valid coefficients (values being not "0") of the AC component AC are also expressed by a group number and added bits.

The AC component AC, therefore, is subjected to the so-called zigzag scanning for scanning data from a lower to higher frequency component, the two-dimensional Huffman coding is executed on the basis of the number of consecutive invalid components (values being "0"), i.e., the number of zero runs and the group number of the subsequent valid component, and the obtained coded words and added bits are taken as coding data.

The Huffman coding is executed such that a peak frequency of occurrence in a data distribution of each of the DC and AC components DC and AC per frame image is taken as the center, and coded words are obtained by coding data in accordance with bit assignment in which the closer the data to the center, the fewer the number of bits assigned thereto, and the farther the data from the center, the greater the number of bits assigned thereto.

The above processing is a basic portion of this system.

With this basic portion alone, however, since no constant amount of codes can be obtained for each image due to the use of the Huffman coding as entropy coding, the following processing, for example, is performed as a method of controlling an amount of codes.

First, the processing of the above basic portion is executed by using a temporary quantization width coefficient $\alpha$ and at the same time a total amount of codes (a total number of bits) generated on the entire screen is obtained (g). On the basis of this total amount of codes, a target amount of codes, and the temporary quantization width coefficient $\alpha$, a quantization width coefficient $\alpha$ optimal for making the amount of codes approach the target amount of codes to a DCT coefficient is predicted by Newton-Raphson iteration (h).

The processing following the quantization of the above basic portion is repeated by using the predicted quantization width coefficient $\alpha$ (i). Subsequently, on the basis of a total amount of presently generated codes, a total amount of previously generated codes, the target amount of codes, the presently used quantization width coefficient $\alpha$, and the previously used quantization width coefficient $\alpha$, the optimal quantization width coefficient $\alpha$ for making the amount of codes approach the target amount of codes is predicted again. If the predicted quantization width coefficient $\alpha$ coincides with the previous quantization width coefficient $\alpha$ and the total amount of presently generated codes is smaller than the target amount of codes, the processing is ended, and presently generated coded data is output and stored in a memory card (f). If otherwise, the quantization width coefficient $\alpha$ is altered, and the processing is repeated by using this new quantization width $\alpha$.

As described above, in a digital electronic still camera, for example, since the number of images recordable in a single memory card, magnetic disk drive, or magnetic tape must be secured, image data is compressed before recording. A processing time required for the compression must be as short as possible and constant from the view point of operability. In addition, the image data compression is preferably executed at a high efficiency. These conditions are somewhat required not only in the digital electronic still cameras but also in other applications.

The above-described system according to the proposal of the international standardization is a compressing method which satisfies the above conditions. In this system, image data is divided into blocks and coded by executing orthogonal transform such as discrete cosine transform, or compression as preprocessing is executed by image information compression represented by predictive coding (DPCM), the compression result is quantized, and the quantized output is coded by variable-length coding represented by the Huffman coding.

Although, however, the image data compressing system using the variable-length coding has a high efficiency, the amount of codes cannot be obtained until coding is actually finished due to the use of the variable-length coding. Therefore, it is difficult to control the amount of codes.

As a method of solving the above problem, the present inventors have proposed the following systems.

In one system, in order to control the amount of generated codes in a compression system using a combination of the DPCM and the variable-length coding, an image signal is sampled and stored in an image memory, and a difference between the sampled signal and a value predicted on the basis of a reference pixel signal which is already coded is calculated to form a differential signal. The differential signal is quantized by a temporary quantization width, and the amount of generated codes is integrated, thereby calculating a total amount of generated codes of an image of one screen. Subsequently, a new quantization width is predicted on the basis of the temporary quantization width, the total amount of generated codes, and a target total amount of codes. The predicted new quantization width is used to execute the DPCM, the quantization, and the variable-length coding, thereby obtaining a total amount of codes. This processing is repeatedly executed to make the total amount of codes approach the target amount of codes, thereby controlling the amount of codes.

In the other method, in order to control the amount of generated codes in a compressing system using a combination of the orthogonal transform and the variable-length coding, a sampled image signal stored in an image memory is divided into blocks, orthogonal transform is executed for each of the divided blocks, and the transformed output is quantized by a temporary quantization width. Thereafter, the quantized output is subjected to variable-length coding, and the amount of generated codes of each block and a total amount of generated codes of the entire image are calculated. Subsequently, a new quantization width is predicted on the basis of the temporary quantization width, the total amount of generated codes, and a target total amount of codes. In addition, an amount of codes assigned to each block is calculated on the basis of the amount of generated codes of each block, the total amount of generated codes, and the target amount of generated codes. The new quantization width is used to repeat the block division of an image signal stored in the image memory, the orthogonal transform, the quantization, and the variable-length coding. If the amount of generated codes exceeds the assigned amount of codes of each block, the variable-length coding is temporarily stopped, and processing of the next block is started. As a result, the amount of codes is controlled such that the total amount of generated codes of the entire image does not exceed the target total amount of generated codes.

That is, in this system, image data is divided into blocks and compression as preprocessing is executed by an image information compressing method such as coding by orthogonal transform represented by the discrete cosine transform (DCT), or the predictive coding (DPCM), the compression result is quantized, and the quantized output is coded by variable-length coding represented by the Huffman coding. In this system, however, since a total amount of codes cannot be obtained until the coding is finished, it is difficult to compress an amount of codes into an optimal value within a short time period. That is, since trials and errors must be repeatedly executed before an optimal quantization width coefficient o is determined, the optimal quantization width coefficient $\alpha$ cannot be rapidly determined.

In particular, in order to realize selection of various types of image quality modes such as low- and high-image quality modes in a single coding apparatus, an optimal compression ratio must be obtained for each of the selected image quality modes. In this case, i.e., in a coding apparatus capable of executing processing in correspondence with a plurality of target amounts of codes, a plurality of quantization width coefficients $\alpha$ must be determined. In a case wherein a target amount of codes is variable as described above, therefore, the above system cannot achieve a proposition of constantly determining an optimal quantization width coefficient $\alpha$ within a short time period.

In recent years, users have various types of needs, e.g., some of them prefer high image quality while others want to record a large number of images even at the sacrifice of the resolution of an image. In order to satisfy these users' needs, therefore, high- and low-image quality modes must be selectively designated. In this case, a target amount of codes per image (per frame) naturally changes, and compression coding must be performed accordingly. The distribution of a spatial frequency of an image, however, varies in accordance with the contents of an image, and a value of the optimal quantization width coefficient $\alpha$ falling within the range of a target amount of codes must be found within a short time period to execute coding. Therefore, the conventional systems in which trials and errors are repeatedly performed at random are unsatisfactory in this respect.

In order to increase the number of images recordable on a recording medium having a limited capacity, a method of changing the compression ratio of data is proposed. For example, Published Unexamined Japanese Patent Application No. 63-286078 proposes a method of selectively using a mode of directly recording data and a mode of compressing and recording data, and Published Unexamined Japanese Patent Application No. 1-292987 proposes a method capable of selecting one of a plurality of image quality modes by switching a degree of compression. Image quality is generally degraded when a compression ratio is increased. In this method, therefore, a mode (low-image quality mode) with an emphasis on the number of recordable images and a high-image quality mode with an emphasis on image quality can be selectively set in accordance with a demand of a user or an application.

In these prior arts, however, since compression circuits having compression ratios corresponding to a plurality of image quality modes must be independently provided and selectively used in accordance with an image quality mode, a hardware arrangement is complicated to increase the size of a camera and a manufacturing cost. In addition, in the above prior arts, non-compression and compression modes are switched or one of a plurality of types of fixed compression ratios is selected. Therefore, a compression ratio cannot be set at an arbitrary value, or the number of images recordable on a recording medium having a predetermined capacity cannot be freely set in accordance with a demand of a user. Furthermore, although the high- and low-image quality modes can be selectively set, a target amount of codes per image (per frame) naturally changes in accordance with the selected mode, and compression coding must be executed in accordance with the changed amount. Since, however, the distribution of a spatial frequency of an image varies in accordance with the contents of an image, a data capacity obtained after compression varies in accordance with the spatial frequency distribution if the selected compression ratio is fixed. Therefore, the number of images recordable on a recording medium having a predetermined capacity is always indefinite and cannot be found unless recording is actually executed, resulting in significant inconvenience in operability.

SUMMARY OF THE INVENTION

It is, therefore, the first object of the present invention to provide an image data coding apparatus and method, which can obtain, even if a target amount of codes is changed, an optimal quantization width coefficient $\alpha$ within a short time period so that an amount of codes is set to be the changed target amount, thereby rapidly compressing the amount of codes to be the changed amount of codes, and can obtain the highest image quality within the range of each target amount of codes.

It is the second object of the present invention to provide an electronic camera apparatus and an electronic camera reproduction apparatus, which can select a desired image quality mode and record a predetermined number of images corresponding to the selected image quality mode or can set a desired number of images and record the set number of images, and can set various compression ratios by common hardware without using hardware for each compression ratio and maintain the highest image quality within the range of the set compression ratio.

In order to achieve the above objects of the present invention, an image data coding apparatus according to the present invention comprises:

preprocessing means for executing preprocessing including compression for input image data in units of screens to generate a preprocessed output;

quantizing means for quantizing the preprocessed output generated by the preprocessing means with a predetermined quantization width to generate a quantized output;

variable-length coding means for executing variable-length coding for the quantized output generated by the quantizing means;

target-amount-of-codes output means for outputting information concerning a target amount of codes corresponding to one screen; and quantization width predicting means for predicting a suitable quantization width on the basis of the information output from the target-amount-of-codes output means to supply information concerning the predicted quantization width to the quantizing means, wherein the quantizing means quantizes the preprocessed output generated by the preprocessing means with the predicted quantization width generated by the quantization width predicting means.

In addition, in order to achieve the above objects of the present invention, an image data coding method according to the present invention comprises:

the first step of setting a quantization width in correspondence with a target amount of codes concerning image data of one screen;

the second step of calculating an amount of codes of each block and an amount of codes of one screen on the basis of data of each block subjected to variable-length coding;

the third step of assigning the amount of codes to each block and predicting a quantization width required for optimization; and the fourth step of executing variable-length coding for each block within the range of an information amount assigned to the block by using the predicted quantization width.

More specifically, according to the present invention, image data is preprocessed (e.g., divided into blocks and subjected to orthogonal transform such as DCT or to DPCM), the preprocessed output is quantized by the quantizing means, and the quantized output is subjected to variable-length coding. In the first arrangement of the present invention, when information of a total amount of codes as a target range is given, a quantization width falling within the range of the total amount of codes as a target range is predicted on the basis of the above information, and information of the predicted quantization width is supplied to the quantizing means to execute quantization with this quantization width. Even when a desired target amount of codes is changed, therefore, an amount of codes close to the changed target amount of codes can be obtained within a short time period. In this arrangement, although coding is performed by only one path, a quantization width close to an optimal quantization width can be obtained since it is set on the basis of the target amount of codes. Therefore, the obtained amount of codes substantially coincides with the target amount of codes. In this case, since the processing is executed by only one pass, the coding can be performed at a very high speed.

In the second arrangement of the present invention, amount-of-codes calculating means calculates a total amount of codes in units of screens in response to a variable-length-coded output and outputs the calculated amount as calculated-amount-of-codes information. Control means supplies information of a total amount of codes as a target range and generates a statistical processing command first. When statistical processing is finished, the control means generates a coding processing command. When execution of the statistical processing is started in accordance with the statistical processing command, the quantization width predicting means predicts a quantization width falling within the range of the total amount of codes on the basis of the information of the total amount of codes generated by the control means and supplies information of the predicted quantization width to the quantizing means. When execution of coding processing is started in accordance with the coding processing command, the quantization width predicting means obtains information of a quantization width corrected to fall within the range of the total amount of codes from the information of the previously predicted quantization width on the basis of the input calculated-amount-of-codes information and supplies the information of the corrected quantization width to the quantizing means. The quantizing means quantizes the preprocessed image data with a quantization width based o this quantization width information.

In the third arrangement of the present invention, the amount-of-codes calculating means calculates a total amount of codes in units of screens in response to an output from the variable-length coding means and outputs the calculated amount as calculated-amount-of-codes information. Control means supplies information of a total amount of codes as a target range and generates an optimization check processing command first. The control means checks in accordance with the calculated amount-of-codes information whether optimization check processing is to be executed again and generates a coding processing command when the optimization check processing is finished. When execution of the optimization check processing is started in accordance with the optimization check processing command, the quantization width predicting means predicts a quantization width falling within the range of the total amount of codes on the basis of the information of the total amount of codes supplied from the control means and supplies information of the predicted quantization width to the quantizing means. If information of a predicted quantization width is already present, the quantization width predicting means obtains information of a quantization width corrected to fall within the range of the total amount of codes from the information of the previously predicted quantization width on the basis of the input calculated-amount-of-codes information and supplies the information of the corrected quantization width to the quantizing means. When execution of coding processing is started, the quantization width predicting means supplies information of a final quantization width predicted in the optimization check processing described above to the quantizing means. The quantizing means receives the quantization width information and quantizes the preprocessed image data with the received quantization width. In addition, one of the outputs from the variable-length coding means obtained when the coding processing command is generated is used as a final coded output of image data.

In brief, each of the second and third arrangements is an n-path system in which, when a target amount of codes is set changeable, coding processing for a check and prediction of an optimal quantization width are repeatedly executed until the amount of codes falls within the range of a presently designated target amount of codes, and final coding is executed when the optimal quantization width is found. In this system, since the number of repetition times of the coding processing for a check executed until an optimal quantization width for making the amount of codes fall within the range of a target value (until a quantization width falls within the range of an optimal value) is decreased, a processing time required for the coding can be shortened.

In the fourth arrangement of the present invention, image data is divided into blocks and subjected to preprocessing by executing orthogonal transform or predictive coding in units of divided blocks. Thereafter, the preprocessed data is quantized by quantizing means and subjected to variable-length coding by variable-length coding means. In this case, amount-of-codes calculating means calculates a total amount of codes in units of screens in response to an output from the variable-length coding means and outputs the obtained amount as a calculated-amount-of-codes information. Control means supplies information of a total amount of codes as a target range and generates a statistical processing command first. When statistical processing is finished, the control means generates a coding processing command. When execution of the statistical processing is started in accordance with the statistical processing command, quantization width predicting means predicts a quantization width falling within the range of the total amount of codes on the basis of the information of the total amount of codes supplied from the control means and supplies information of the predicted quantization width to the quantizing means. When execution of coding processing is started in accordance with the coding processing command, the quantization width predicting means obtains information of a quantization width corrected to fall within the range of the total amount of codes from the information of the previously predicted quantization width on the basis of the input calculated-amount-of-codes information and supplies the information of the corrected quantization width to the quantizing means. When the statistical processing is executed in accordance with the statistical processing command, coding stop means refers to an amount assigned to each block obtained by amount-of-codes assigning means for obtaining an assigned amount of each block on the basis of the calculated-amount-of-codes information and the total amount of codes as a target range. When the coding processing is executed in accordance with the coding processing command and the calculated-amount-of-codes of each block reaches the assigned amount of codes of the block, the coding stop means controls the variable-length coding means to stop coding for the block. The quantizing means receives the information of the quantization width and quantizes the preprocessed data wit the received quantization width. The variable-length coding means stops coding for a block presently being processed each time it receives the stop command.

In brief, the fourth arrangement is a two-path system which finishes processing by two paths. That is, this system uses the fact that an optimal quantization width coefficient $\alpha$ can be rapidly and precisely found by executing statistical processing by using a coefficient $\alpha$ capable of giving a quantization width for giving an amount of codes close to a target amount of codes. In this system, quantization of the first path is performed by using a quantization width coefficient set on the basis of a target amount of codes and close to an optimal quantization width as a temporary quantization width coefficient, a quantization width coefficient capable of making the amount of codes fall within the range of the target amount of codes is calculated from a total amount of codes obtained by the quantization of the first path, and the calculated quantization width coefficient is used in the second path to execute final coding. As a result, image data can be precisely coded with a maximum target amount of codes within a short time period, and the amount of codes can be set closest to an allowable amount of codes. Therefore, the amount of lost data can be minimized and at the same time a good image quality can be maintained.

The present invention is a coding apparatus for preprocessing image data, quantizing the preprocessed output, and executing variable-length coding for the quantized output, characterized in that a quantization width of the quantization is variably set to be an optimal value in accordance with a target amount of codes.

In this manner, the image data can be quantized with the optimal quantization width so as to fall within the range of a target amount of codes and subjected to variable-length coding. It is a well known fact that when image data is preprocessed, quantized, and subjected to variable-length coding, the amount of generated codes changes when a quantization width is changed in quantization. That is, variable-length coding represented by Huffman coding reduces the amount of codes required to express data to be coded by using an offset in generation probability of the data. Therefore, since "a quantization width is changed" also means that a generation probability of a quantization value is changed, the amount of generated codes naturally changes when the quantization width is changed. In addition, even when the same coding is executed with the same quantization width, the amount of generated codes changes in accordance with the type of image data. If, however, the same coding is executed by changing the quantization width with respect to image data of a predetermined amount, a predetermined relationship is obtained between the quantization width and the amount of generated codes. When a large number of image data are used to obtain a relationship between the quantization width and the amount of generated codes, it is confirmed that a relationship, the following relationship in many cases, having a highest occurrence frequency is statistically obtained. That is, assuming that a relative ratio with respect to a certain quantization width is SF and the amount of generated codes is represented by the number of bits (bit rate) per pixel BR, a relationship represented by $\log BR = a \times \log SF + b$ is obtained. In this relation, a is substantially constant regardless of the type of an image if coding is the same, and b depends on an image. The value of b has a predetermined distribution in accordance with the type of an image, and typical b is obtained from this occurrence frequency distribution. The characteristic feature of the present invention is that a quantization width corresponding to a target amount of codes is set by using this relationship between the quantization width and the amount of codes.

According to the present invention, therefore, there is provided an image coding apparatus and method, which can calculate, even when a target amount of codes is changed, an optimal quantization width coefficient $\alpha$ for giving a quantization width capable of setting the amount of codes to be the changed target amount of codes within a short time period in accordance with the changed target amount of codes, thereby rapidly compressing image data into the target amount of codes, and can obtain highest image quality within the range of each target amount of codes.

According to another aspect of the present invention, there is provided an electronic camera apparatus which has an image pickup system for generating an image signal and in which the image signal obtained by the image pickup system is preprocessed (e.g., divided into blocks and subjected to orthogonal transform such as DCT or to DPCM) by image information compressing means and quantized by quantizing means, the quantized output is subjected to variable-length coding by variable-length coding means, and the variable-length-coded image signal data is recorded and stored in a recording medium for recording image data so that the recorded data can be read out. In the first arrangement of the present invention, when information corresponding to a desired compression ratio is input from input means, quantization width setting means outputs information of a quantization width corresponding to the input compression ratio information to the quantizing means and recording means. The recording means records the quantization width information supplied from the quantization width setting means in the recording medium so that the recorded information can be read out. The quantizing means receives the quantization width information output from the quantization width setting means and quantizes the preprocessed image signal data with the received quantization width. According to this arrangement, the quantization width setting means stores information of optimal quantization widths corresponding to various compression ratios beforehand, and information of an optimal quantization width can be supplied by only reading out the stored information in correspondence with input compression ratio information. Therefore, when coding is to be executed within the range of a target amount of codes, the coding processing can be finished within a very short time period, and an arrangement of hardware can be simplified.

In the second arrangement of the present invention, when information corresponding to a desired compression ratio is input from input means, means for supplying information of a total amount of codes as a target range per image supplies information of a total amount of codes as a target range per image on the basis of the input compression ratio information. Quantization width predicting means predicts a quantization width falling within the range of the total amount of codes on the basis of the total-amount-of-codes information and supplies information of the predicted quantization width to the quantizing means to execute quantization with this quantization width. Recording means records the quantization width information predicted by the quantization width predicting means in a recording medium so that the recorded information can be read out. Therefore, even when a desired compression ratio is input and a total amount of codes (target amount of codes) per image is changed by the change in compression ratio, an amount of codes close to the target amount of codes can be obtained within a short time period by using not independent hardware for each compression ratio but common hardware for all compression ratios. In this arrangement, although coding is performed by only one pass, a quantization width close to an optimal quantization width can be obtained since it is set on the basis of a target amount of codes, and the obtained amount of codes can substantially coincide with the target amount of codes. In this arrangement, since the processing is executed by only once pass, coding can be performed at a very high speed.

In the third arrangement of the present invention, when information corresponding to a desired compression ratio is input from input means, control means obtains information of a total amount of codes as a target range per image on the basis of the input compression ratio information and supplies the obtained information to quantization width predicting means. The control means generates a statistical processing command first, and the quantization width predicting means predicts a quantization width falling within the range of the total amount of codes on the basis of the total-amount-of-codes information from the control means and supplies the predicted quantization width to the quantizing mean as temporary quantization width information. The quantizing means quantizes image signal data from an image pickup system with this quantization width, and the quantized image signal data is supplied to image signal compressing means and subjected to variable-length coding. Amount-of-codes calculating means receives the variable-length-coded output from the image signal compressing means to calculate a total amount of codes in units of screens and outputs the obtained amount as a calculated amount-of-codes information to the quantization width predicting means.

When the statistical processing is finished, the control means generates a coding processing command. The quantization width predicting means predicts a quantization width falling within the range of the total amount of codes on the basis of the input calculated amount-of-codes information and the previously predicted quantization width information, thereby obtaining information of a new predicted quantization width. The quantization width predicting means supplies the corrected quantization width information to the quantizing means to quantize the preprocessed image data with a quantization width based on this quantization width information. Recording means records the quantization width information predicted by the quantization width predicting means in a recording medium so that the recorded information can be read out.

In brief, the third arrangement is a two-pass system in which a desired compression ratio can be supplied, and even when a total amount of codes (a target amount of codes) is changed in accordance with this change in compression ratio, coding processing for a check is executed, i.e., quantization is performed with temporary quantization width information determined by a presently designated target amount of codes to execute variable-length coding, an optimal quantization width is predicted on the basis of the obtained total amount of codes, and quantization is executed with the predicted optimal quantization width to perform final coding. In this system, since the coding processing for a check is performed, an optimal quantization width for making the final amount of codes fall within the range of the target value can be found, and a maximum amount of data can be recorded within the range of the target amount of codes. In addition, since the processing can be performed by using not independent hardware for each compression ratio but common hardware for all compression ratios, the manufacturing cost and the size of the system can be decreased.

In the fourth arrangement of the present invention, image data is divided into blocks and preprocessed by performing orthogonal transform or the like for each of the divided blocks. The preprocessed image data is quantized by quantizing means and subjected to variable-length coding by variable-length coding means. In this case, when information corresponding to a desired compression ratio is input from input means, control means obtains information of a total amount of codes as a target range per image on the basis of the input compression ratio corresponding information and supplies the obtained information to quantization width predicting means. The control means generates a statistical processing command first, and the quantization width predicting means predicts a quantization width falling within the range of the total amount of codes on the basis of the information of the total amount of codes supplied from the control means and supplies the predicted quantization width as temporary quantization width information to the quantizing means. The quantizing means quantizes image signal data from an image pickup system by using the supplied quantization width information, and the quantized image signal data is supplied to image signal compressing means and subjected to variable-length coding. Amount-of-codes calculating means receives the output from the variable-length coding means to calculate a total amount of codes in units of screens and outputs the obtained amount as calculated amount-of-codes information.

Amount-of-codes assigning means calculates an assigned amount of codes of each block on the basis of the calculated amount-of-codes information and the total amount of codes as a target range.

When the statistical processing is finished, the control means generates a coding processing command, and the quantization width predicting means predicts an optimal value of a quantization width falling within the range of the total amount of codes on the basis of the input calculated amount-of-codes information and the previously predicted quantization width information and supplies information of the quantization width having the predicted optimal value to the quantizing means to quantize the preprocessed image data with a quantization width corresponding to this quantization width information.

The quantized output from the quantizing means is subjected to variable-length coding by the variable-length coding means. The amount-of-codes calculating means receives the output from the variable-length coding means to calculate a total amount of codes in units of screens and outputs the calculated amount as calculated amount-of-codes information. Coding stop means refers to an assigned amount of codes for each block calculated by the amount-of-codes assigning means. When the coding processing is executed in accordance with the coding processing command and the calculated amount-of-codes information of each block reaches the assigned amount of codes of the block, the coding stop means controls the variable-length coding means to stop coding for the block. The quantizing means receives the quantization width information to quantize the preprocessed image data with the received quantization width, and the variable-length coding means performs variable-length coding for the quantized data and out puts the coded data. The variable-length coding means, however, stops coding for a block presently being processed each time it receives the stop command. Recording means records the quantization width information predicted by the quantization width predicting means in a recording medium so that the information can be read out.

In brief, the fourth arrangement is a two-pass system which finishes the processing by two passes. That is, the fourth arrangement uses the fact that an optimal quantization width coefficient α can be rapidly and precisely found by executing statistical processing by using a coefficient α for giving a quantization width capable of obtaining an amount of codes close to a target amount of codes. In the fourth arrangement, quantization of the first pass is executed by using a quantization width coefficient set on the basis of a target amount of codes and close to an optimal quantization width as a temporary quantization width coefficient, a quantization width coefficient falling within the range of the target amount of codes is determined from the total amount of codes obtained by the quantization of the first pass, and the determined quantization width coefficient is used in the second pass to execute final coding. Since the amount of codes is adjusted in units of blocks and coding in a block is stopped when the amount of codes exceeds an assigned amount of codes in the block, the amount of codes perfectly falls within the range of the target amount. As a result, image data can be precisely coded within a maximum range of a target amount of codes within a short time period, and an amount of codes closest to an allowable amount of codes can be obtained. Therefore, the amount of lost data can be minimized, and a good image quality can be maintained. In addition, since the processing can be executed by using not independent hardware for each compression ratio but common hardware for all compression ratios, the manufacturing cost and the size of the system can be decreased.

The fifth arrangement of the present invention relates to a reproduction apparatus for reproducing variable-length-coded image signal data photographed by an electronic camera apparatus capable of recording a photographed image by a desired compression ratio and recorded in a recording medium. In the fifth arrangement, since the recording medium records the variable-length-coded image signal data and information of a quantization width associated with this image signal data, reading means can read out the data when the recording medium is loaded. When the reading means reads out the data, the readout variable-length-coded image signal data is decoded by decoding means and supplied to inverse quantizing means. Since the quantization width information read out by the reading means is also supplied to the inverse quantizing means, the inverse quantizing means inversely quantizes the data decoded by the decoding means on the basis of the quantization width information read out by the reading means. Output means converts the inverse-quantized data into an image signal and outputs the signal. The output image signal from the output means obtained as a reproduction signal of the image can be displayed on a monitor unit, i.e., reproduced as an image or printed out by a printer.

As described above, since decoding is executed by using the optimal quantization width used in photography upon reproduction of the coded image signal, coding with a desired compression ratio can be realized by single common hardware without providing independent hardware for each compression ratio. Similarly, decoding of image data coded by a desired compression ratio can be realized by single common hardware without providing independent hardware for each compression ratio.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a diagram for explaining zigzag scanning of divided block of 8×8 pixels;

DETAILED DESCRIPTION OF THE PREFERRED EMBODIMENTS

Figure 1:
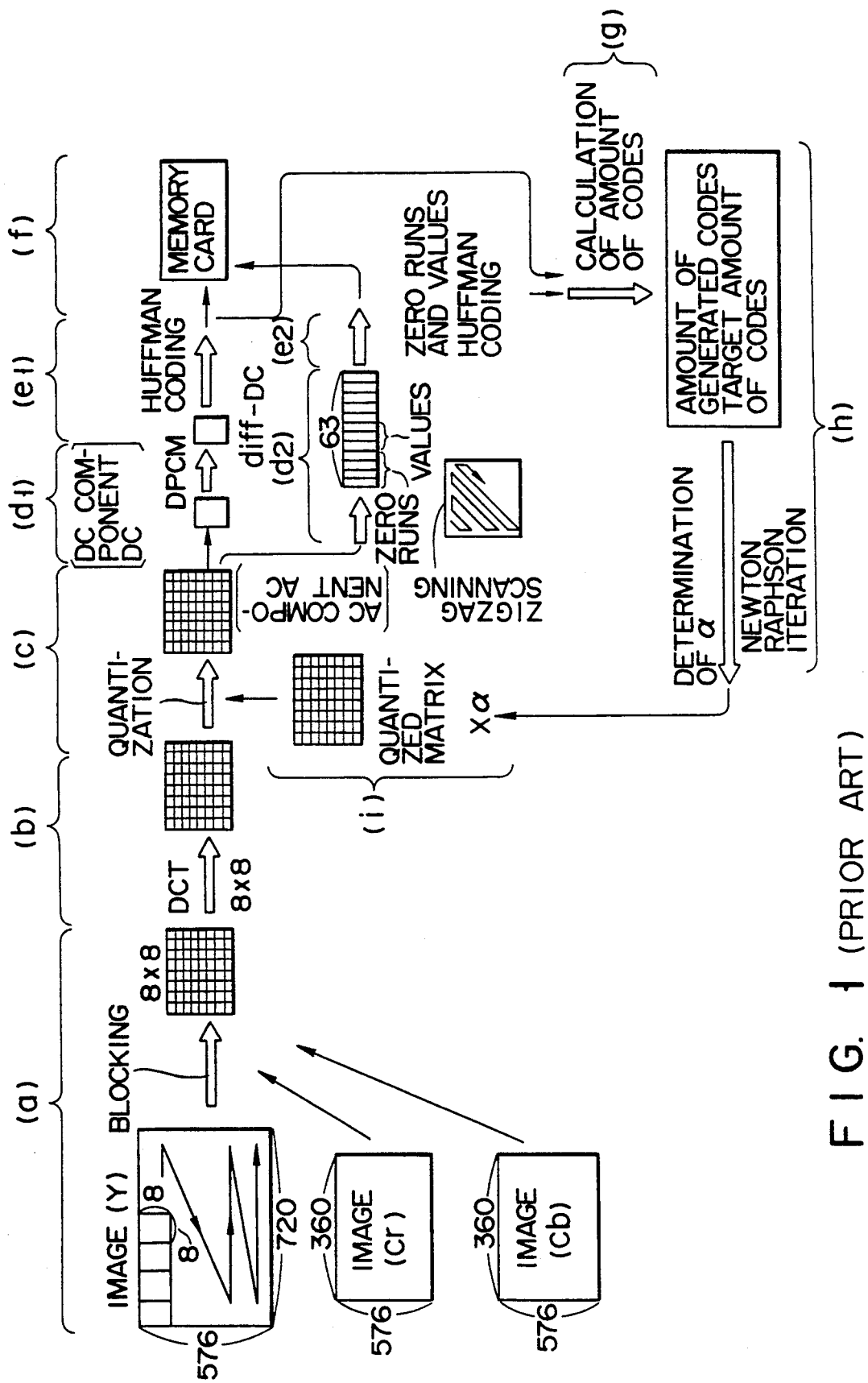
FIG. 1 is a diagram of operational transition for explaining the principle of a conventional coding method.

Embodiments of the present invention will be described below with reference to the accompanying drawings.

A basic principle of one embodiment of the present invention will be described below for better understanding of the present invention.

That is, in the present invention, statistical processing is executed first as processing of the first pass to predict an optimal quantization width coefficient and to determine an amount of codes to be assigned to each block. Subsequently, final coding processing is executed as processing of the second pass. In the second pass, data of each block is quantized by the predicted quantization width coefficient and the quantized data is coded, and the coding progresses while the amount of codes of the block is monitored such that the amount of codes falls within the range of the assigned amount of codes of the block. When the amount of codes including an EOB (End Of Block) code reaches the assigned amount of codes, the coding of the block is finished, and the processing advances to coding of the next block. In addition, in order to make the amount of codes fall within the range of a target amount of codes as fast as possible, a function of giving a reference quantization width coefficient α capable of obtaining an amount of codes close to a target amount of codes which changes in accordance with a photographic mode such as a low- or high-image quality mode to the first pass is given to the statistical processing system in advance.

The statistical processing is executed to predict an optimal quantization width and determine an assigned amount of codes of each block. The prediction of an optimal amount of codes is processing for making the amount of codes obtained upon coding roughly (but considerably precisely) approach a target amount of codes. The amount of codes can be made to approach the target amount of codes by using this optimal quantization width. If the amount of codes falls within the range of the target amount of codes at this time, this processing alone is satisfactory. If an upper limit of a data amount of an image of one frame is defined, however, the amount of codes cannot exceed a target amount of codes by not only one byte but also one bit. It is therefore necessary to provide processing for a case where such data overflow occurs.

This processing is determination of an amount of codes assigned to each block. The processing is executed to determine data to be used in fine adjustment performed when the amount of codes obtained upon coding exceeds a target amount of codes. On the basis of the results obtained by actually executing the coding processing by using an optimal quantization width predicted in the statistical processing, the statistical processing may be finished when the obtained amount of codes does not exceed a target amount of codes, and postprocessing may be performed when the obtained amount of codes exceeds the target amount of codes. In this case, however, three steps of the statistical processing, the coding processing, and the postprocessing must be performed to prolong a processing time, and data must be distinctly saved between the coding processing and the postprocessing without linking codes of different lengths. In this respect, it is desirable to perform fine adjustment during the coding processing. To unnecessarily thin data leads to degradation in image quality and therefore must be avoided.

In this embodiment of the present invention, therefore, data of each block is omitted from a high frequency component to minimize a visual influence. Since, however, whether the amount of codes exceeds a target amount of codes cannot be determined before coding is finished, this determination is executed in units of blocks in the present invention.

It is confirmed through experiments that no large change is found in a relative ratio between the amounts of codes of blocks generated when coding is performed by an optimal quantization width or a quantization width predicted by the statistical processing, and the present invention uses this fact. That is, when coding is to be executed by using a temporary quantization width (which can be roughly predicted on the basis of a target amount of codes) in the statistical processing, the amount of codes generated in each block falls within the range of a target amount of codes. In this case, a guide line "under which the amount of codes of the entire image does not exceed a target amount of codes" is set for each block and used as a reference level to monitor an assigned amount of codes of each block.

When the quantization width and the assigned amount of codes of each block are determined as described above, the coding processing is executed on the basis of the determined data to perform final coding.

In the coding processing of this embodiment, coding is stopped in each block so that the amount of codes does not exceed an assigned amount of codes of the block.

In coding of each block, it is checked whether the amount of codes exceeds the guide line (an assigned amount of codes) of the block while the coding is sequentially executed from a low to high frequency component. If the amount of codes does not exceed the guide line of the block, the coding is directly finished, i.e., an EOB is output. If the amount of codes exceeds the guide line of the block, however, the coding of the block is immediately stopped without coding higher frequency components, and an EOB is output. In this case, since the EOB is one of Huffman codes, the amount of codes including an EOB must fall within the range of assigned amount of codes.

Assuming that the coding is finished without being stopped in half blocks while it is stopped by omitting some very high frequency components in the remaining half, the amount of information to be lost is very small, and the lost information can be limited to information of high frequency components having no significant visual effect. According to this system, coding can be constantly finished by two steps of the statistical processing and the coding processing, and a total amount of codes can be set within the range of a defined value without repeatedly executing optimization unlike in conventional systems. In addition, degradation in image quality can be suppressed.

An embodiment of an apparatus using the above principle will be described below.

Figure 2:
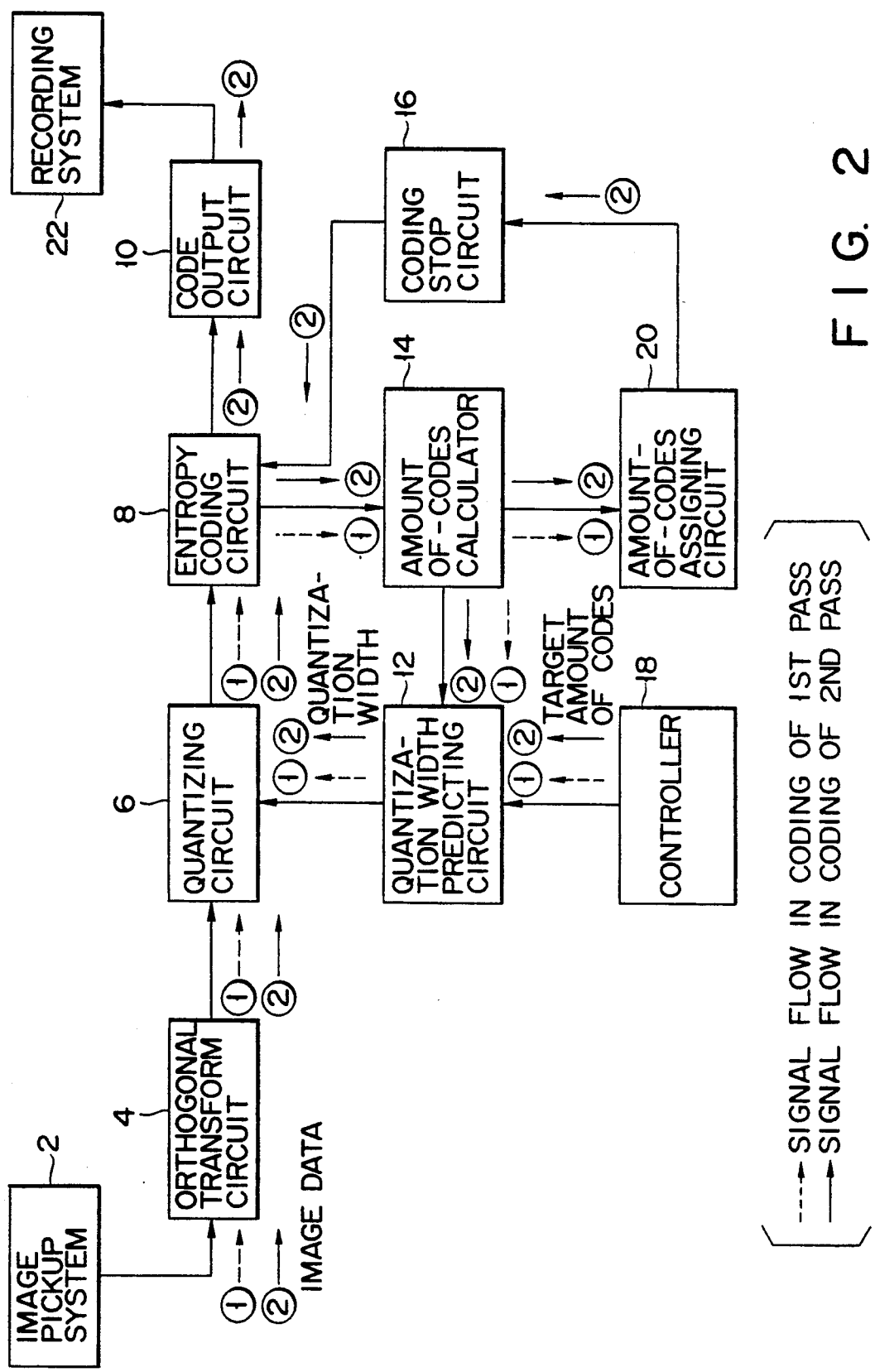
FIG. 2 is a block diagram showing the first embodiment of the present invention.

FIG. 2 is a block diagram showing an embodiment in which an image data coding apparatus according to the present invention is applied to a digital electronic camera (an arrangement of which will be described later).

Referring to FIG. 2, reference numeral 2 denotes an image pickup system, constituted by a photographic lens and an image pickup device such as a CCD, for converting an optical image focused on the image pickup device by the photographic lens. The image pickup system 2 includes a processor for separating an image signal obtained by the image pickup device into color components of Y, R-Y (to be referred to as Cr (chroma red) hereinafter), and B-Y (to be referred to as Cb (chroma blue) hereinafter) of a color signal and executing gamma correction or white balance processing.

The image pickup system 2 further includes an A/D converter for performing digital conversion. This A/D converter performs digital conversion for the Y component of a luminance signal system and the Cr and Cb components of a chroma (C; color difference signals) system. In the image pickup system 2, image data of one frame is stored in an image buffer memory (not shown). In order to perform statistical processing for the luminance-based signal first, for example, the data is read out from the image data buffer memory, and Y-component data of the image signal processed by the processor is A/D-converted and stored in the image data buffer memory. When the processing for the Y-component data is finished, the chroma-based Cr- and Cb-component data is processed, A/D-converted, and stored in the image data buffer memory.

The image data buffer memory is an image memory divided for the Y component and the Cr and Cb components and has a capacity for storing at least one frame of image.

The image pickup system 2 further includes a blocking circuit for executing blocking processing for dividing image data (of one frame or one field) for the Y components and the Cr and Cb components into blocks having a predetermined size. In this embodiment, the block size is 8×8 pixels. The block size, however, is not limited to 8×8 pixels but may be different between Y and C (chroma system). In this embodiment, luminance-based Y-component data is read out, divided into blocks, and supplied to a processing system of the subsequent stage to execute statistical processing for the Y-component data. When the statistical processing is finished, in order to start statistical processing for chroma-based Cr- and Cb-component data, the chromabased Cr- and Cb-component data is read out and divided into blocks. Blocking of the chroma-based components is performed such that all of Cr-component image data is blocked first and then Cb-component image data is blocked.

Reference numeral 4 denotes an orthogonal transform circuit for receiving the blocked input image data and performing two-dimensional orthogonal transform for the received image data in units of blocks. As the orthogonal transform, cosine transform, sine transform, Fourier transform, and Hadamard transform can be used. Image data as a transform coefficient can be obtained by executing the orthogonal transform.

Reference numeral 6 denotes a quantizing circuit. When the quantizing circuit 6 receives image data (transform coefficient) output from the orthogonal transform circuit 4, it quantizes the transform coefficient with a quantization width corrected by multi-plying a predetermined quantization width of each frequency component by a quantization width coefficient $\alpha$ set in advance in correspondence with a photographic mode in the first quantization and executes quantization by using an optimal quantization width coefficient c determined in the previous processing in the second quantization.

Reference numeral 8 denotes an entropy coding circuit for executing entropy coding (variable-length coding) for the quantized output supplied from the quantizing circuit 6. As the entropy coding, Huffman coding, arithmetic coding, or the like can be used. Since the entropy coding is variable-length coding, the amount of codes of each block or that of the entire image changes in units of images. Although the type of entropy coding is not associated directly with the present invention, an operation of this embodiment will be described below by taking Huffman coding as a example.

The entropy coding circuit 8 scans an input quantized transform coefficient from a low to high frequency component by a method called zigzag scanning which scans in an order shown in FIG. 6. That is, referring to the scanning order shown in FIG. 6, a differential value between data of the first DC component [DC] and a DC component of an immediately preceding block subjected to the entropy coding is Huffman-coded and output. If a transform coefficient which is not "0" (i.e., valid) is found while the transform coefficients are checked from the second to sixty-fourth AC components in the scanning order of FIG. 6, the entropy coding circuit 8 performs two-dimensional Huffman coding for data on the basis of the number of consecutive transform coefficients of "0" (invalid), or zero runs, immediately preceding the valid transform coefficient and the value of the valid transform coefficient and outputs the coded data. If consecutive invalid coefficients are present from a certain coefficient to the 64th one, the circuit 8 outputs a code of EOB (End Of Block) indicating the end of a block. If the entropy coding circuit 8 receives a stop signal, it stops the coding and generates an output added with an EOB. Thereafter, the circuit 8 outputs an amount of codes generated in the block to an amount-of-codes calculator 14.

The calculator 14 calculates an amount of codes of each of input components Y, Cr, and Cb for each block and obtains a product of these amounts of codes, thereby acquiring amount-of-codes data of each component Y, Cr, or Cb for each block and calculating the amount of codes of the entire image of one frame. The calculator 14 outputs the amount-of-codes data of the entire image of one frame to a quantization width predicting circuit 12 and outputs the amount of codes of each block and the amount-of-codes data of the entire image of one frame to an amount-of-codes assigning circuit 20.

When quantization of the first pass is started, the quantization width predicting circuit 12 receives information of a target amount of codes from a controller 18, sets an initial value of a quantization width coefficient $\alpha$ on the basis of the received amount-of-codes information by using a relationship represented by equation (1) (to be described later), and outputs the initial value to the quantizing circuit 6. Before processing of the second pass is started, on the basis of the amount of codes of the entire image of one frame supplied from the amount-of-codes calculator 14 and a target amount of codes which is a maximum amount of data allowable per image of one frame, the circuit 12 predicts an optimal quantization width coefficient $\alpha$ for making the image data approach the target amount of codes by using, e.g., Newton-Raphson iteration in consideration of a presently actually used quantization width coefficient.

The amount-of-codes assigning circuit 20 calculates an assigned amount of codes of each block on the basis of the amount of codes of image data of the block, the amount of codes of the entire image of one frame, and the target amount of codes supplied from the amount-of-codes calculator 14 and outputs the calculated assigned amount of codes to a coding stop circuit 16.

The calculation method of this embodiment is, e.g., proportional distribution of the target amount of codes using a ratio between the amounts of codes of the individual blocks. For example, the amount-of-codes assigning circuit 20 multiplies the amount of codes of one block by the target amount of codes and divides the product by the amount of codes of the entire image of one frame, thereby determining an assigned amount of codes of the block.

The amount-of-codes assigning circuit 20 has an amount-of-codes information table and an amount-of-codes-assigned-to-block data table. When amount-of-codes information of one block is input from the amount-of-codes calculator 14, the circuit 20 rewrites amount-of-codes information at a corresponding block position in the amount-of-codes information table by the input amount-of-codes information. In addition, the amount-of-codes assigning circuit 20 calculates an assigned amount of codes of each block on the basis of the amount of codes of the block and the amount of codes of the entire image of one frame supplied from the amount-of-codes calculator 1 and the target amount of codes and stores the calculated data of the assigned amount of codes of each block in the amount-of-codes-assigned-to-block data table.

When a certain block is subjected to the entropy coding, an assigned amount of codes of the block stored in the amount-of-codes-assigned-to-block table is supplied to the coding stop circuit 16.

The coding stop circuit 16 subtracts the amount of codes of the block supplied from the amount-of-codes assigning circuit 20 from the assigned amount of codes of the block. If the remainder of the assigned amount of codes is smaller than a total amount of codes of an amount of codes to be transferred and a code of EOB, the circuit 16 outputs a stop signal to the entropy coding circuit 8 to stop coding of the block.

The coding stop circuit 16, therefore, refers to the assigned amount of codes and does not stop coding when the amount of codes does not exceed the assigned amount of codes even if the received amount of codes to be transferred and the code of EOB are sent out. That is, the circuit 16 completes the coding of the block and subtracts the amount of codes to be transferred from the assigned amount of codes of the block.

Reference numeral 10 denotes a code output circuit for connecting variable-length codes input from the entropy coding circuit 8. The circuit 10 writes the connected codes in a recording system 22 constituted by a recording medium such as a memory card.

The system of this embodiment executes statistical processing first by using a reference quantization width coefficient $\alpha$ for initialization determined in accordance with a photographic mode (first pass), thereby checking the information amount of each block, the information amount of the entire image of one frame, and the like required for optimization. Subsequently, the system starts processing for executing coding optimized on the basis of the information obtained by the statistical processing (second pass).

The system of this embodiment, therefore, executes procedures in an order of blocking of an image, quantization of elements of the blocked image using a standard quantization width coefficient $\alpha$, entropy coding of a transform coefficient obtained by the quantization, prediction of a quantization width coefficient $\alpha$ required for obtaining an optimal amount of codes on the basis of amount-of-codes information of each element in each block obtained by the entropy coding and amount-of-codes information of the entire image of one frame, determination of an assigned amount of codes of each element in each block, transition to a processing mode for executing optimal coding for the to-be-processed image based on the above pieces of information, blocking of the image performed by executing the above processing mode, quantization of the elements of the blocked image using the predicted quantization width coefficient $\alpha$, entropy coding of a transform coefficient obtained by the quantization, and output processing for saving all codes of the to-be-processed image. The general control of the above procedures is performed by the controller 18 shown in FIG. 2. Note that this control function of the controller 18 can be easily realized by using a microprocessor (CPU).

An operation of the apparatus having the above arrangement of the present invention will be described below with reference to operational transition shown in FIG. 5.

When an object to be photographed is photographed, an image of the object to be photographed is focused as an optical image on an image pickup device arranged behind the photographic lens. The image pickup device converts the focused optical image into an image signal and outputs the signal to a processor. The processor separates the image signal into signals of different color components Y, Cr (R-Y), and Cb (B-Y) and executes gamma correction and white balance processing.

Of the image signals of different color components, the Y component is A/D-converted and stored in a Y-component area of an image data buffer memory, and the Cr and Cb components are A/D-converted and stored in Cr- and Cb-component areas, respectively, of the image data buffer memory.

Subsequently, statistical processing of the first pass is started. The image pickup system 2 reads out the Y-component data from the image data buffer memory, and a blocking circuit divides the readout image data of one frame (or one field) into blocks having a predetermined size, i.e., performs blocking. The size of a block is, e.g., $8 \times 8$ pixels. In this embodiment, the image pickup system 2 reads out the Y component (luminance component), and processing (statistical processing) is executed for the readout component in the subsequent stage. Thereafter, blocking is performed for image data of the Cr component, and the statistical processing is executed for the blocked data in the subsequent stage. Similarly, an image of the Cb component is blocked, and the blocked image is subjected to the statistical processing in the subsequent stage.

The image data in each block obtained by the blocking circuit of the image pickup system is supplied to the orthogonal transform circuit 4. The circuit 4 executes two-dimensional orthogonal transform such as discrete cosine transform (DCT) for the blocked input image data (to be referred to as block image data hereinafter) in units of blocks. This orthogonal transform or DCT is processing for dividing a waveform into frequency components and expressing them by the same number of cosine waves as that of input samples.

The orthogonal-transformed block image data (transform coefficient) is stored in a corresponding frequency component position of an $8 \times 8$ matrix (i.e., stored in a matrix in which the origin of the matrix is a DC component, other positions are AC components, and the frequency is increased as the position is separated from the origin) and input to the quantizing circuit 6.

The quantizing circuit 6 performs quantization of the first pass (the first quantization) for the input block image data (transform coefficient). In this first quantization, the transform coefficient is quantized by using a quantization width obtained by multiplying a predetermined quantized matrix for each frequency component (determined in accordance with each matrix position of a block) by a standard (temporary) quantization width coefficient $\alpha$ ((h1) and (i) in FIG. 5). In this case, although the quantized matrix may be the same for luminance and chroma systems, better results can be obtained by independently setting quantized matrixes suitable for the two systems.

The quantized block image data (transform coefficient) is input to the entropy coding circuit and subjected to entropy coding. The entropy coding circuit 8 zigzag-scans the input quantized transform coefficient in an order shown in FIG. 6, thereby executing scanning from a low to high frequency component. That is, since the transform coefficients are stored in the $8 \times 8$ matrix in correspondence with frequency components and the frequency is decreased as the position moves closer to the origin, scanning can be executed from a low to high frequency component by the zigzag scanning.

Figure 5:
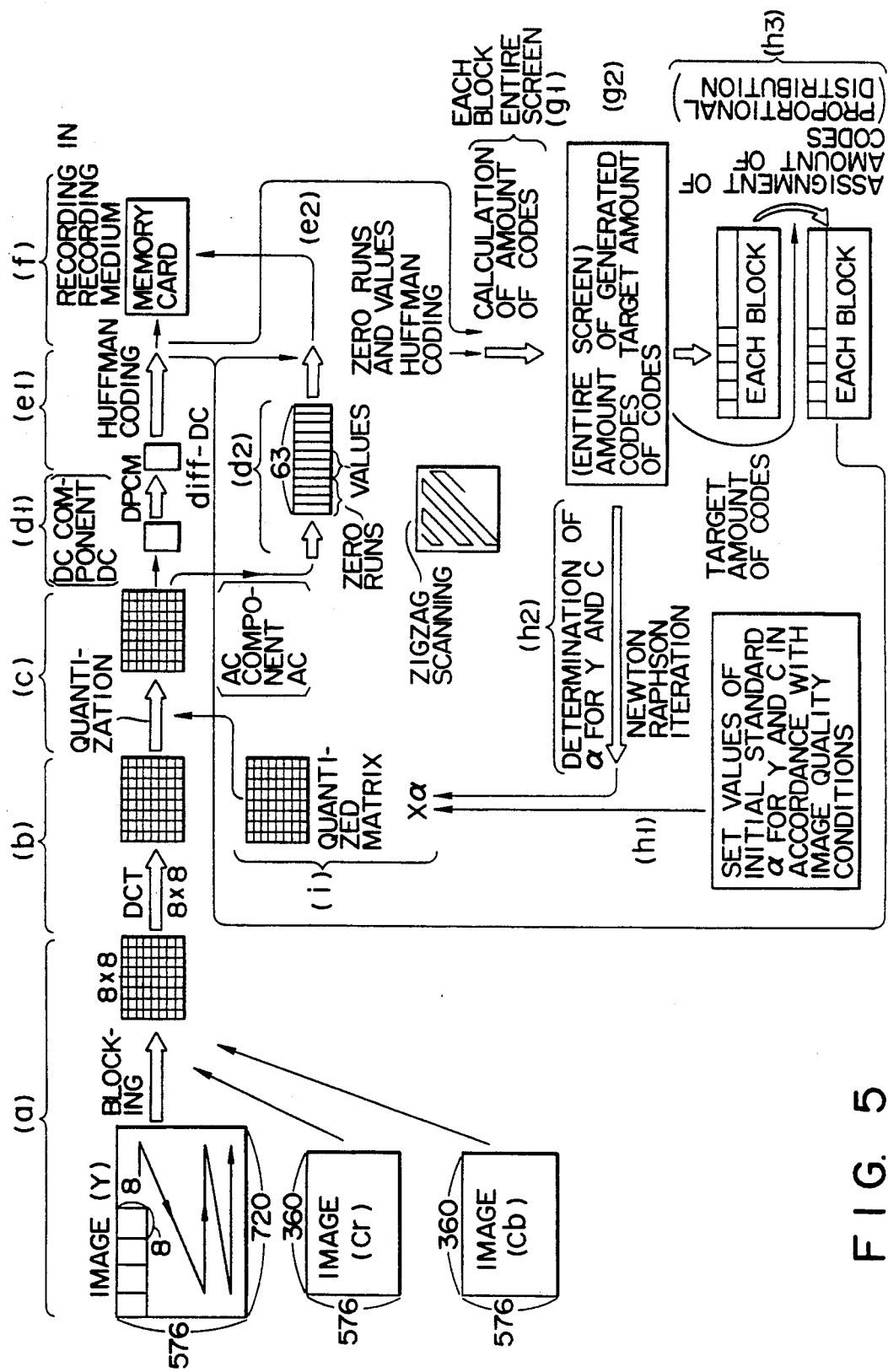
FIG. 5 is a diagram of operational transition for explaining the principle of a coding method of the present invention.

Since the first data in the scanning order shown in FIG. 6 is a DC component DC, a differential value diff-DC between the data of this DC component DC and a DC component DC of a block (an immediately preceding block) subjected to the entropy coding is Huffman-coded ((d1) and (e1) in FIG. 5). If any transform coefficient which is not "0" (i.e., valid) is found while the transform coefficients are sequentially checked from the second to sixty-fourth Ac components AC in the scanning order shown in FIG. 6, the data is subjected to two-dimensional Huffman coding on the basis of the number of consecutive transform coefficients of "0" (invalid), or zero runs, immediately preceding the valid transform coefficient and a value of the valid transform coefficient ((d2) and (e2)).

If consecutive invalid coefficients are present from a certain coefficient to the 64th one, the entropy coding circuit 8 outputs a code of EOB (End Of Block) indicating the end of a block.

Subsequently, the circuit 8 outputs an amount of codes generated in the block to the amount-of-codes calculator 14 (g1). This processing is similarly executed for all blocks of an image of one frame.

In order to calculate the amount of codes of the entire image of one frame of the input individual components Y, Cr, and Cb, the amount-of-codes calculator 14 calculates an amount of codes of each of the Y, Cr, and Cb components for each block and obtains a product of the calculated amounts of codes (g2). In addition, the circuit 1 outputs the amount-of-codes data of each block to the amount-of-codes assigning circuit 20. The circuit 20 writes the received amount-of-codes data of each block as amount-of-codes information in a corresponding block position of the amount-of-codes information table.

When the Huffman coding is completely performed for all blocks of the image of one frame, the amount-of-codes calculator 14 outputs the amount-of-codes data of the entire image of one frame to the quantization width predicting circuit 12 and the amount-of-codes assigning circuit 20 under the control of the controller 18.

The quantization width predicting circuit 12 predicts an optimal quantization width coefficient $\alpha$ for making the calculated amount of codes approach a target amount of codes on the basis of the input amount-of-codes data of the entire image and target-amount-of-codes data by using, e.g., Newton-Raphson iteration in consideration of the actually used quantization coefficient ((h2) in FIG. 5).

The amount-of-codes assigning circuit 20 calculates an assigned amount of codes of each block on the basis of the amount of codes of each block and the amount of codes of the entire image of one frame input to the circuit 20 and the target amount of codes by executing, e.g., proportional distribution of the target amount of codes by using a ratio between the amounts of codes of the individual blocks ((h3) in FIG. 5). More specifically, in order to determine an assigned amount of codes of a certain block, the amount of codes of this block is multiplied by the target amount of codes, the obtained product is divided by the amount of codes of the entire image of one frame, and the result is used as the assigned amount of codes. Data of the calculated assigned amount of codes of each block is stored in the amount-of-codes-assigned-to-block data table. When a certain block is to be subjected to the entropy coding, the assigned-amount-of-codes data of the block stored in the amount-of-codes-assigned-to-block data table is supplied to the coding stop circuit 16.

In this manner, the first pass, i.e., the first coding (statistical processing) for determining the assigned amount of codes of each bock and optimizing the quantization width is completed.

Subsequently, processing of the second pass is started. This processing of the second pass is the second coding (coding processing) for obtaining a final coded output optimized to make the amount of codes fall within the target amount of codes.

This processing is executed for the Y component first and then the Cr and Cb components. That is, the image data of the Y component (luminance component) stored in the image data buffer memory of the image pickup system 2 is read out to the blocking circuit and blocked again (a). The block image data is supplied to the orthogonal transform circuit 4 and orthogonal-transformed again (b). The transform coefficient obtained by the orthogonal transform is input to the quantizing circuit 6 and quantized again (c). Note that a quantization width coefficient $\alpha$ used in this quantization is an optimal quantization width coefficient $\alpha$ predicted by the quantization width predicting circuit 12 in the first pass.

The transform coefficient of the quantized block image data is input to the entropy coding circuit 8. As in the statistical processing, the circuit 8 first executes Huffman coding for the differential value diff-DC of the DC component DC of the transform coefficients of this block image data ((d1) and (e1)) and then sequentially extracts data of the AC component AC by zigzag scanning to perform two-dimensional Huffman coding ((d2) and (e2)).

Each time a Huffman code for one element (one position in the matrix) is generated, the amount-of-codes assigning circuit 20 outputs a to-be-transferred assigned amount of codes at a corresponding element position stored in the amount-of-codes-assigned-to-block data table to the coding stop circuit 16. If it is determined on the basis of the assigned amount of codes of each block that the to-be-transferred amount of codes and the code of EOB sent together do not exceed the assigned amount of codes, the coding stop circuit 16 does not generate a stop signal and subtracts the to-be-transferred amount of codes from the assigned amount of codes of the block. If a total amount of codes of the to-be-transferred amount of codes of the block and the code of EOB exceeds the remainder of the assigned amount of codes, the coding stop circuit 16 outputs a stop signal to the entropy coding circuit 8 to stop Huffman coding of the block. The entropy coding circuit 8 starts Huffman coding of the next block obtained by the quantizing circuit 6.

The entropy coding circuit 8 therefore outputs the transformed Huffman code to the code output circuit 10 until the stop signal is supplied from the coding stop circuit 16. If the Huffman coding i completely performed for all elements in the matrix before the stop signal is generated, the entropy coding circuit 8 outputs the code of EOB to the code output circuit 10. If the stop signal is input before the Huffman coding is completely performed for all elements in the matrix, the entropy coding circuit 8 outputs the code of EOB in place of the Huffman code to the code output circuit 10. The code output circuit 10 temporarily stores the coded data.

Subsequently, the entropy coding circuit 8 starts Huffman coding of the next block obtained by the quantizing circuit 6.

The above operation is repeatedly executed until the processing is completely performed for all blocks of an image of one screen, thereby finishing the entire coding processing. When the processing for the Y component is finished in this manner, processing for the chroma-based components Cr and Cb is executed in the same manner. Also in the processing for the chroma-based components, the quantizing circuit 6 uses the optimal quantization width coefficient α predicted by the quantization width predicting circuit 12 in the first pass.

When the above processing of the second pass is completely performed for the chroma-based components in all blocks of the image of one frame, the entire coding processing is finished.

At the end of the processing, the code output circuit 10 outputs the optimized Huffman-coded data of an image of one frame to the recording system 22 and writes the data in a storage medium such as a memory card of the recording system 22 (f). This data writing is executed by an output from the code output circuit 10. That is, the circuit 10 connects variable-length Huffman codes supplied from the entropy coding circuit 8 and supplies the connected codes to the storage medium, thereby executing the data writing. This data writing in the storage medium performed by the output from the code output circuit 10 may be collectively executed when the second-pass processing is finished or sequentially executed each time a byte or several bytes of connected variable-length Huffman codes is or are obtained after the first pass is completed and the second pass is started.

Prior to the above processing, the code output circuit 10 writes the optimal quantization width coefficient α used in the coding in a header portion of stored data of the coded image as a key for reproduction.

As described above, in the apparatus of this embodiment, statistical processing is executed by using a temporary quantization width, and an optimal quantization width is predicted on the basis of data obtained by the processing, thereby making the amount of codes in coding processing approach a target amount of codes. In addition, an assigned amount of codes of each block is determined so that the amount of codes in the coding processing does not exceed the target amount of codes. This is the key point of the present invention. The present invention, therefore, is not limited to the block size, the type of orthogonal transform, and the type entropy coding used in this embodiment. Furthermore, the image data buffer memory may be arranged between the orthogonal transform circuit 4 and the quantizing circuit 6 so that the blocking and orthogonal transform processes in the coding processing are omitted. In this case, however, the size of the image memory is increased in order to keep high precision. Moreover, the processing may be performed before A/D conversion. In the apparatus of this embodiment, the entropy coding for each block is performed from a low frequency component, and a high frequency component having no significant effect on image quality is coded in a range with a margin in assigned amount of codes. Therefore, the coding can be performed with a high compression ratio while degradation in image quality is minimized.

In brief, in the above embodiment of the present invention having the arrangement shown in FIG. 2, quantization of the first pass is executed by using a quantization width obtained from a target amount of codes and close to an optimal quantization width as a temporary quantization width of the first pass, and an optimal quantization width is predicted by using amount-of-codes data obtained by the first quantization and is used in coding of the second pass as final processing. This is because an optimal quantization width coefficient α can be rapidly found with high precision when the statistical processing is performed by using a quantization width coefficient α for giving an amount of codes close to the target amount of codes. Therefore, quantization of the first pass is executed by using a quantization width coefficient set on the basis of a target amount of codes and close to an optimal quantization width as a temporary quantization width coefficient, and a quantization width coefficient capable of making the amount of codes fall within the range of the target amount of codes is determined o the basis of a total amount of codes obtained by the first quantization and is used in the second pass to execute final coding.

In this manner, a possible maximum amount of image data can be precisely coded within a range of the target amount of codes within a short time period, and the amount of codes can approach closest to an allowable amount of codes. Therefore, the amount of data to be lost is minimized to maintain high image quality. As a result, quantization can be performed with high prediction precision and less image quality degradation caused by coding, i.e., with high image quality.

Since optimization of a temporary quantization width coefficient in the above processing is an important factor of the present invention, this optimization will be briefly described below.

When image data is preprocessed and quantized and the quantized output is subjected to variable-length coding, it is a well known fact that the amount of generated codes is changed when a quantization width of the quantization is changed. That is the variable-length coding represented by Huffman coding decreases the amount of codes required to express data to be coded by using an offset in occurrence probability of the data, and "a quantization width is changed" described above also means that an occurrence probability of a quantized value is changed. Therefore, the amount of generated codes is changed by changing the quantization width.

Even if the same coding is executed with the same quantization width, the amount of generated codes changes in accordance with the type of image data. If, however, the same coding is executed for specific image data while a quantization width is changed, a predetermined relationship is obtained between the quantization width and the amount of generated codes. In addition, when a relationship between the quantization width and the amount of generated codes was obtained by using a large number of image data, it was confirmed that a relationship having the highest occurrence frequency was statistically obtained.

More specifically, assuming that a relative ratio to a given quantization width is SF and the amount of generated codes represented by the number of bits (bit rate) per pixel is BR, the following relationship was obtained in many cases:

$$\log BR = a \times \log SR + b \qquad (1)$$

where a is substantially constant provided that coding is the same and b depends on an image. The value of b has a predetermined distribution according to the type of image, and typical b can be obtained from this occurrence frequency distribution.

Although one embodiment of the present invention has been described above, the characteristic feature of the present invention is that a quantization width is set in accordance with a target amount of codes by using a relationship between the quantization width and the amount of codes.

In the above arrangement shown in FIG. 2, a series of operations are completed by the first and second passes upon compression coding, and an optimal quantization width coefficient $\alpha$ is found in the first pass. Referring to FIG. 2, signal flows in the first pass are indicated by dotted arrows 1, and those in the second pass are indicated by solid arrows 2. The above operations will be described below in accordance with these signal flows.

When coding of image data is started, a target amount of codes is set in the controller 18. Image data output from the image pickup device in the image pickup system 2 is converted into a digital signal, divided into blocks of 8×8 pixels, and supplied to the orthogonal transform circuit 4. The circuit 4 executes orthogonal transform (in this embodiment, DCT and which may be predictive coding (DPCM)) for each block. The DCT-transformed coefficient obtained by the orthogonal transform circuit 4 is supplied to the quantizing circuit 6. The controller 18 outputs a target amount of codes to the quantization width predicting circuit 12. The circuit 12 sets an initial value of a quantization width coefficient $\alpha$ on the basis of the input target amount of codes by using the relationship represented by equation (1) and outputs the set value to the quantizing circuit 6. The circuit 6 performs linear quantization for the transform coefficient by using the input quantization width coefficient $\alpha$. The quantized transform coefficient is supplied to the entropy coding circuit 8 to perform variable-length coding (in this embodiment, Huffman coding).

The input quantized coefficient is subjected to scanning called zigzag scanning executed from a low to high frequency component, and a differential value between the first DC component data and a DC component in an immediately preceding block subjected to the variable-length coding is Huffman-coded and output.

If a transform coefficient which is not "0" (i.e., valid) is found while the transform coefficients are sequentially checked from the second to sixty-fourth Ac components AC in the scanning order, the data is subjected to two-dimensional Huffman coding on the basis of the number of consecutive transform coefficients of "0" (invalid), or zero runs, immediately preceding the valid transform coefficient and a value of the valid transform coefficient. If consecutive invalid outputs are present from a certain coefficient to the 64th one, a code of EOB (End Of Block) indicating the end of a block is output. Each time the coding as described above is finished in each block, the variable-length coding circuit 8 outputs an amount of codes generated in the block to the amount-of-codes calculator 14. When the coding is completely performed for an image of one frame, the circuit 14 accumulates the input amount of codes of the individual blocks and calculates an amount of codes of the entire image of one frame as a total amount of codes. This total amount of codes is output to the quantization width predicting circuit 12 and the amount-of-codes assigning circuit 20 for assigning an amount of codes of each block and that of the entire image.

When the above coding processing of the first pass is finished, coding processing of the second pass is subsequently performed for the same image data. In the second pass, the image data read out from the memory in the image pickup system 2 is converted into a digital signal, subjected to processing such as blocking into 8×8 pixels, and input to the orthogonal transform circuit 4. The circuit 4 performs orthogonal transform for the input block image data in units of blocks. The DCT-transformed transform coefficient obtained by the orthogonal transform circuit 4 is supplied to the quantizing circuit 6.

The quantization width predicting circuit 12 predicts a more optimal quantization width coefficient $\alpha$ on the basis of the amount of codes of the image obtained by the coding of the first pass and the target amount of codes supplied from the controller 18 and outputs the predicted quantization width coefficient to the quantizing circuit 6. The image data is supplied again from the buffer memory in the image pickup system 2 to the orthogonal transform circuit 4, and the DCT is executed for each block. The obtained transform coefficient is linearly quantized by the quantizing circuit 6 by using the predicted quantization width. The quantized coefficient is input to the variable-length coding circuit 8 and Huffman-coded in the same as in the coding of the first pass. An amount of codes generated in this coding is compared with the assigned amount of codes of the block obtained in the coding of the first pass and stored in the amount-of-codes assigning circuit 20. If the amount of generated codes exceeds the assigned amount of codes, the coding stop circuit 16 stops coding in the block. The coded data controlled to fall within the range of the target amount of codes as described above is sequentially output to the recording system 22 via the code output circuit 10.

In this embodiment, since quantization of the first pass is executed by using a quantization width coefficient set on the basis of a target amount of codes and close to an optimal quantization width as a temporary quantization width $\alpha$ of the first pass, a more optimal quantization width coefficient can be predicted by using the obtained amount-of-codes data. Therefore, in a photographic system capable of selecting a photographic mode in accordance with an application from, e.g., a low-image quality photographic mode for obtaining a maximum number of images even at the sacrifice of image quality and a high-image quality photographic mode with an emphasis not on the number of images but on image quality, a possible maximum amount of codes of an image falling within a range of a target amount of codes corresponding to each mode can be obtained.

That is, the present invention can provide a system capable of predicting a quantization width coefficient α for obtaining the above results and therefore executing quantization with less degradation in image quality caused by coding, i.e., with high image quality.

The above embodiment of the two-pass system is suitable for coding in which a photographic mode is selected in accordance with one of a plurality of predetermined stepwise levels, e.g., low image quality and high image quality and the highest image quality is obtained within a short time period. The system of the embodiment, however, is still unsatisfactory for coding in which image quality can be selected not stepwise but arbitrarily and the highest image quality is obtained within this arbitrary range. An n-pass system is suitable for such a requirement.

An embodiment of this n-pass system according to the present invention will be described below as the second embodiment.

In this embodiment, coding of the first pass is repeatedly executed until the amount of codes obtained by the coding coincides with a target amount of codes, thereby controlling the amount of codes.

Figure 3:
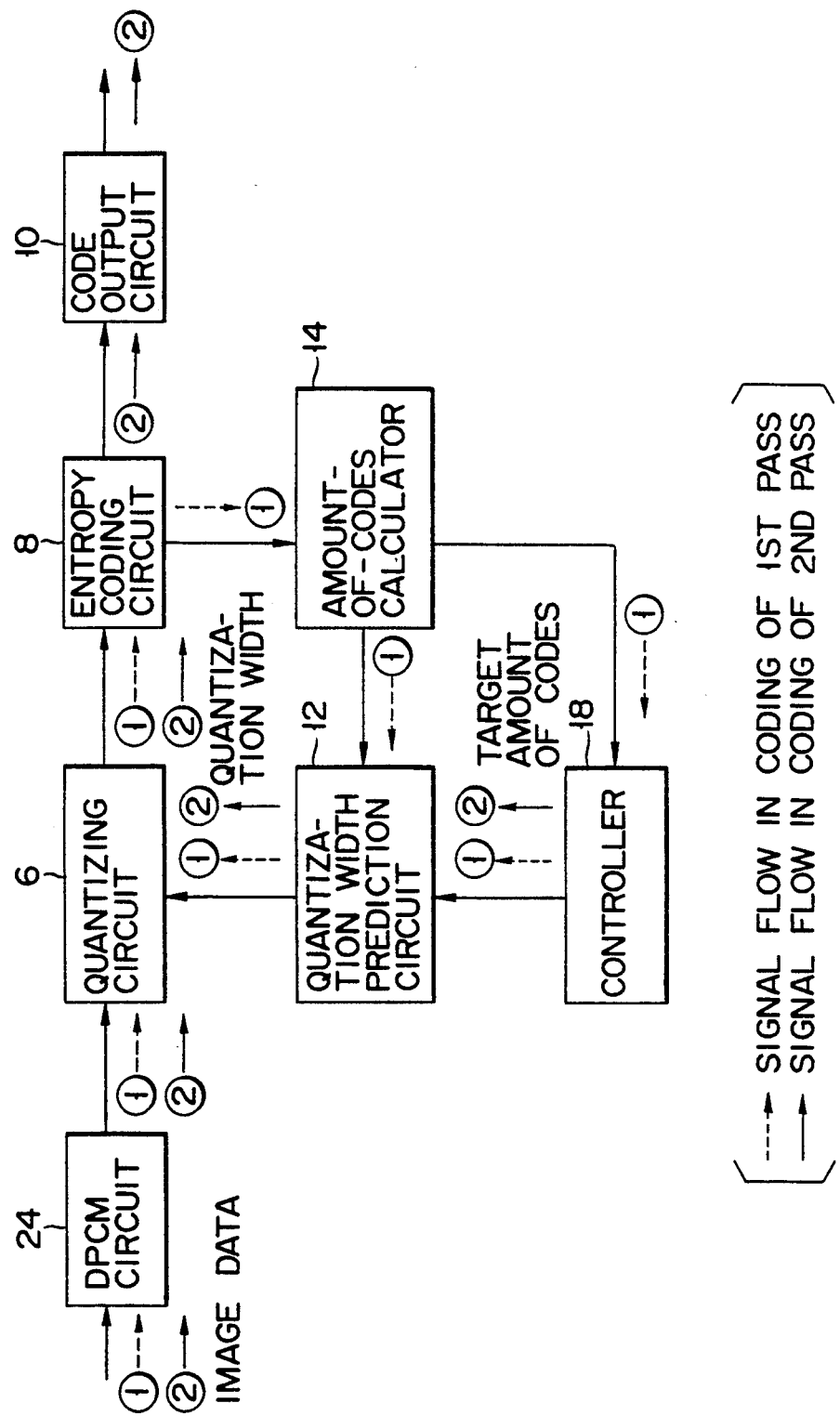
FIG. 3 is a block diagram showing the second embodiment of the present invention.

FIG. 3 shows an arrangement of the n-pass system. In this embodiment, although a DCPM circuit 24 for executing predictive coding (DCPM) as preprocessing coding is used, an orthogonal transform circuit may be adopted.

In the second embodiment, the present invention is applied to an apparatus for coding image signals, obtained by an image pickup system, by a compression method using a combination of the DCPM and variable-length coding and recording the coded signals. Since the arrangement of this embodiment is basically the same as that shown in FIG. 2, the same reference numerals as in FIG. 2 denote the same parts in FIG. 3.

As shown in FIG. 3, an apparatus of the second embodiment comprises the DCPM circuit 24 described above, a quantizing circuit 6, an entropy coding circuit 8, a quantization width predicting circuit 12, a code output circuit 10, an amount-of-codes calculator 14, and a controller 18. An image data output supplied from an image pickup system 2 in each pass is input to the DCPM circuit 24 for executing predictive coding. The image data subjected to the predictive coding is supplied to the quantizing circuit 6.

More specifically, the DCPM circuit 24 receives input image data and executes the predictive coding for the received image data.

When the quantizing circuit 6 receives the image data (predictive-coded data) output from the DCPM circuit 24, it quantizes a transform coefficient with a corrected quantization width multiplied by a quantization width coefficient α supplied from the quantization width predicting circuit 12.

The entropy coding circuit 8 performs entropy coding for the quantized output supplied from the quantizing circuit 6. Since the entropy coding i variable-length coding, the amount of codes of the entire image changes in units of images. Although the type of entropy coding is not associated directly with the present invention, Huffman coding is adopted in this embodiment. That is, the entropy coding circuit 8 executes the Huffman coding for the input quantized data and outputs the Huffman-coded data. The amount of codes generated by the Huffman coding is sequentially output to the amount-of-codes calculator 14.

The calculator 14 integrates the amounts of codes of each of the Y, Cr, and Cb components to calculate an amount of codes of the entire image of one frame for each of the Y, Cr, and Cb components and outputs data of the calculated amount of codes of the entire image to the quantization width predicting circuit 12.

When the first pass (check processing) is started, the quantization width predicting circuit 12 receives information of a target amount of codes from the controller 18, sets an initial value of a quantization width coefficient α on the basis of the received amount-of-codes information by using a relationship represented by equation (1) to be described later, and outputs the initial value to the quantizing circuit 6. Before the next pass is started, on the basis of the amount of codes of the entire image input from the amount-of-codes calculator 14 and a target amount of codes as a maximum data amount allowable per image of one frame, the quantization width predicting circuit 12 predicts an optimal quantization width coefficient α for making the amount of codes approach the target amount of codes by using, e.g., Newton-Raphson iteration in consideration of the presently actually used quantization width coefficient.

The code output circuit 10 connects variable-length codes input from the entropy coding circuit 8 and writes the connected codes in a recording system 22 constituted by a recording medium such as a memory card.

When an image quality set value (an amount of codes as a reference range per image of one frame; a target amount of codes) is set, the controller 18 inputs the set target amount of codes to the quantization width predicting circuit 12 before execution of the first pass is started. Thereafter, each time execution of the first pass (check processing) for an image of one frame is finished, the controller 18 receives the total amount of codes calculated by the amount-of-codes calculator 14 and compares the received amount with the target amount of codes. If the two amounts do not coincide with each other, the controller 18 generates a command to the quantization width predicting circuit 12 so as to execute prediction of the quantization width coefficient α again and so controls the system a to execute the check processing (first pass) again. If the total amount of codes approaches close enough to the target amount of codes and falls within the range of the target amount of codes, the controller 18 controls the system to execute coding (coding processing) of the second pass by using a presently obtained predicted value of the quantization width coefficient α.

In the system of the second embodiment, the first check processing (first pass) is performed by using a standard quantization width coefficient α for an initial operation determined in correspondence with an arbitrary image quality set value supplied to the controller 18, and the controller 18 checks whether a total amount of codes obtained by the processing reaches a maximum possible value falling within a range of a target amount of codes. If the amount does not reach the value, a quantization width coefficient α required to execute new optimization is obtained in consideration of the presently used quantization width coefficient α, and the second check processing (first pass) is executed. The controller 18 checks whether a total amount of codes obtained by the processing reaches the maximum possible value falling within the range of the total amount of codes. If the amount does not reach the value, a quantization width coefficient α required to execute new optimization is obtained in consideration of the presently used quantization width coefficient $\alpha$, and the third check processing (first pass) is executed. The controller 18 repeatedly controls the system in this manner until the total amount of codes reaches the maximum possible value falling within the range of the target amount of codes. If the amount reaches the value, the controller 18 so controls the system as to execute the final coding processing (second pass) by using the present quantization width coefficient $\alpha$.

In this processing, a reference ratio with respect to the target amount of codes, e.g., 90% or 95% is determined in advance, and whether the total amount of codes reaches the maximum possible value falling within the range of the target amount of codes is checked in accordance with whether the amount falls within the predetermined ratio. As the ratio is set closer to 100%, although better image quality falling within the range of the target amount of codes is obtained, the number of repetition times of the processing performed before the amount of codes falls within the range of an optimal value is increased. As the ratio is separated from 100%, the amount of codes falls within the optimal value earlier though the image quality is degraded.

An operation of the apparatus of the second embodiment having the above arrangement will be described in detail below. The image data of the Y, Cr, and Cb components is first subjected to coding processing of the Y component and then to coding processing of the Cr and Cb components to finally obtain compression-coded data of an image of one frame, and the obtained data is recorded in a storage medium. In this processing, as in the arrangement shown in FIG. 2, the image data is subjected to preprocessing, i.e., DPCM executed by the DPCM circuit 24, and the preprocessed image data is input to the quantizing circuit 6.

In an initial stage, the controller 18 supplies data of a target amount of codes based on the conditions set before the processing is started to the quantization width predicting circuit 12 and controls the system to start the processing. The quantization width predicting circuit 12 therefore obtains a standard quantization width predicting coefficient $\alpha$ based on the above equation (1) in accordance with the input target-amount-of-codes data and supplies the obtained coefficient to the quantizing circuit 6. The circuit 6 quantizes the preprocessed input data by using the supplied standard quantization width predicting coefficient $\alpha$. The quantized data is entropy-coded by the entropy coding circuit 8 and supplied to the amount-of-codes calculator 14. The calculator 14 integrates the amounts of codes of the supplied entropy-coded data and supplies the integrated value (total amount of codes) to the quantization width predicting circuit 12 and the controller 18a when the processing is completely performed for an image of one screen. The controller 18 compares the obtained total amount of codes with the target amount of codes. If the two amounts do not coincide with each other within an allowable range, the controller 18a generates a command to the quantization width predicting circuit 12 so as to execute prediction of the quantization width coefficient $\alpha$ and so controls the system as to execute the check processing again. Upon reception of the command, the quantization width predicting circuit 12 predicts a quantization width coefficient $\alpha$ required to make the amount of codes approach the target amount of codes on the basis of the total amount of codes supplied from the amount-of-codes calculator 14 and supplies the obtained predicted value of the new quantization width coefficient $\alpha$ to the quantizing circuit 6.

Since the image pickup system sequentially sends image data again, the DPCM circuit 24 preprocesses the sent image data by DPCM and supplies the preprocessed image data to the quantizing circuit 6. The circuit 6 quantizes the supplied data with a new quantization width coefficient $\alpha$ and supplies the quantized data to the entropy coding circuit 8. The circuit 8 executes the entropy coding for the quantized data and supplies the coded data to the amount-of-codes calculator 14. The calculator 14 integrates the amounts of codes of the supplied entropy-coded data and supplies the integrated value (total amount of codes) to the quantization width predicting circuit 12 and the controller 18a when the processing for an image of one screen is finished. The controller 18 compares the supplied total amount of codes with the target amount of codes. If the two amounts do not coincide with each other within an allowable range, the controller 18 generates a command to the quantization width predicting circuit 12 so as to predict a quantization width coefficient $\alpha$ again and so controls the system as to execute the check processing again, thereby repeatedly executing the above operation.

If the total amount of codes and the target amount of codes coincide with each other within the allowable range, the controller 18 controls the system to finish the check processing and execute the final coding processing (second pass) by using a present quantization width coefficient $\alpha$.

As a result, since the image pickup system sequentially sends image data again, the DPCM circuit 24 preprocesses the send image data by DPCM and supplies the preprocessed image data to the quantizing circuit 6. The circuit 6 executes linear quantization for the supplied image data with an optimal quantization width by using the quantization width coefficient $\alpha$ used in the previous final check processing. The quantized data is subjected to entropy coding (variable-length coding; compression coding) by the entropy coding circuit 8 and supplied to the code output circuit 10.

The above processing is similarly executed for the Cr and Cb components. When all coded data of the entire image is acquired in the code output circuit 10, the circuit 10 outputs the coded data to the recording system and writes the data in the recording medium.

As described above, when the quantizing circuit 6 receives image data (to-be-prediction-coded data) output from the DCPM circuit 24, it quantizes a transform coefficient with a value obtained by multiplying a predetermined quantization width for each frequency component by the quantization width coefficient $\alpha$ determined under the conditions defined by the above equation (1) in accordance with the target amount of codes in the first quantization. In the second and subsequent processing stages, the check processing for executing quantization by using an optimal quantization width coefficient $\alpha$ determined in the immediately preceding processing to find an optimal quantization width coefficient $\alpha$ falling within the range of the target amount of codes is repeatedly performed. When the amount of codes approaches close enough to the target amount of codes by the check processing, the final coding processing is executed to perform compression coding for the data. Therefore, even when the target amount of codes is an arbitrary value, compression coding capable of maintaining highest possible image quality falling within the range of the amount of codes can be performed. In addition, since a standard best quantization width coefficient $\alpha$ corresponding to the target amount of codes is obtained as an initial quantization width coefficient $\alpha$ before coding is started, a quantization width coefficient $\alpha$ capable of obtaining an amount of codes close to and falling within the range of the target amount of codes can be rapidly found to realize compression coding capable of maintaining the highest image quality within a short time period. In particular, since a quantization width coefficient capable of obtaining a quantization width close to an optimal quantization width set in accordance with the target amount of codes is used as a quantization width coefficient for obtaining an initial temporary quantization width, a quantization width coefficient capable of obtaining the optimal quantization width can be rapidly converged to an optimal value. Therefore, a processing time required for the coding can be shortened, and compression coding capable of maintaining the highest image quality within the range of the target amount of codes can be performed.

In brief, in the second embodiment described above, coding of the first pass is repeatedly executed until the amount of codes obtained by the coding coincides with a target amount of codes, thereby controlling the amount of codes. In the second embodiment, coded image data is subjected to the coding of the first pass by an operation similar to that of the first embodiment. Each time the processing for one image is finished, a total amount of codes is output to the controller 18a and compared with the target amount of codes by the controller 18. If the two amounts do not coincide with each other, the quantization width predicting circuit 12 predicts a quantization width coefficient $\alpha$, and the coding (statistical processing) of the first pass is executed again. When the total amount of codes approaches close enough to and falls within the range of the target amount of codes, the controller 18 starts coding (coding processing) of the second pass, and image data subjected to preprocessing of DPCM by the DPCM circuit 24 is linearly quantized by the quantizing circuit 6 by using an optimal quantization width obtained when the total amount of codes falls within the range of the target amount of codes. The quantized data is subjected to variable-length coding and supplied as a final output.

In the above embodiment, since a quantization width coefficient capable of obtaining a quantization width close to an optimal quantization width set in accordance with a target amount of codes is found and used as a quantization width coefficient for obtaining an initial temporary quantization width, the quantization width can be rapidly converged to an optimal value. Therefore, a processing time required for the coding can be shortened.

Note that the variable-length-coded data obtained in the final processing of the first pass may be used in the coding processing of the second pass.

Although the two embodiments of the present invention have been described above, the characteristic feature of the present invention is that a quantization width coefficient $\alpha$ required to obtain an amount of codes close to a given target amount of codes is calculated on the basis of the target amount of codes and used in coding. Therefore, an amount of codes close to a target amount of codes can be initially obtained. An embodiment based on this fact and capable of obtaining a substantially optimal value in the first pass will be described below as the third embodiment of the present invention.

Figure 4:
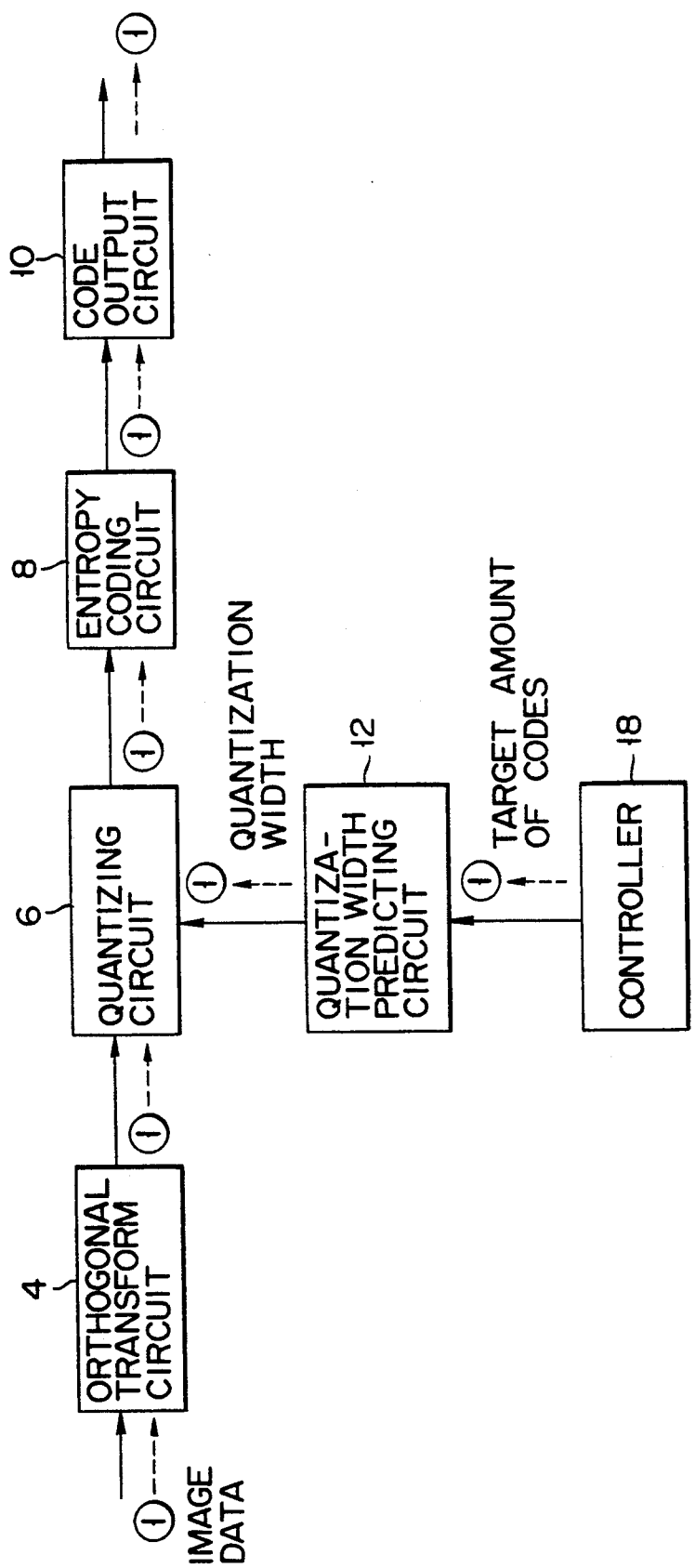
FIG. 4 is a block diagram showing the third embodiment of the present invention.

In the third embodiment, coding is performed only once in the first pass, and an optimal value is obtained in the first pass alone. FIG. 4 shows an arrangement of a system according to the third embodiment. In this embodiment, the same reference numerals as in the above embodiments denote the same parts and a detailed description thereof will be omitted.

In the system of the third embodiment, when an arbitrary image quality set value is given to a controller 18, coding is executed by using a standard quantization width coefficient $\alpha$ determined in accordance with the given image quality set value. That is, image data is preprocessed by orthogonal transform (or DCPM), and a quantization width predicting circuit 12 calculates a standard quantization width coefficient $\alpha$ on the basis of a target amount of codes supplied from the controller 18 and outputs the calculated coefficient to a quantizing circuit 6. The circuit 6 executes linear quantization by using a quantization width corrected by the supplied quantization width coefficient $\alpha$. The quantized transform coefficient is entropy-coded by an entropy coding circuit 8 and output to a code output circuit 10. The coded output is supplied to a recording system by the circuit 10 and recorded in a recording medium.

As described above, even when coding is executed by only a single pass, since a quantization width is set on the basis of a target amount of codes, the quantization width close to an optimal quantization width can be obtained, and the amount of codes can substantially coincide with the target amount of codes. In addition, since the processing is executed only once, coding can be performed at a very high speed.

In each of the above embodiments, a quantization width is set on the basis of a target amount of codes. In an application in which a plurality of target amounts of codes are selectively used in accordance with the type of mode, however, quantization widths corresponding to the respective modes may be prepared beforehand and selectively used in accordance with the type of mode.

An embodiment in which an image data coding apparatus (represented by a coding circuit 80) according to the present invention is applied to a digital electronic camera will be described below with reference to FIG. 7.

Figure 7:
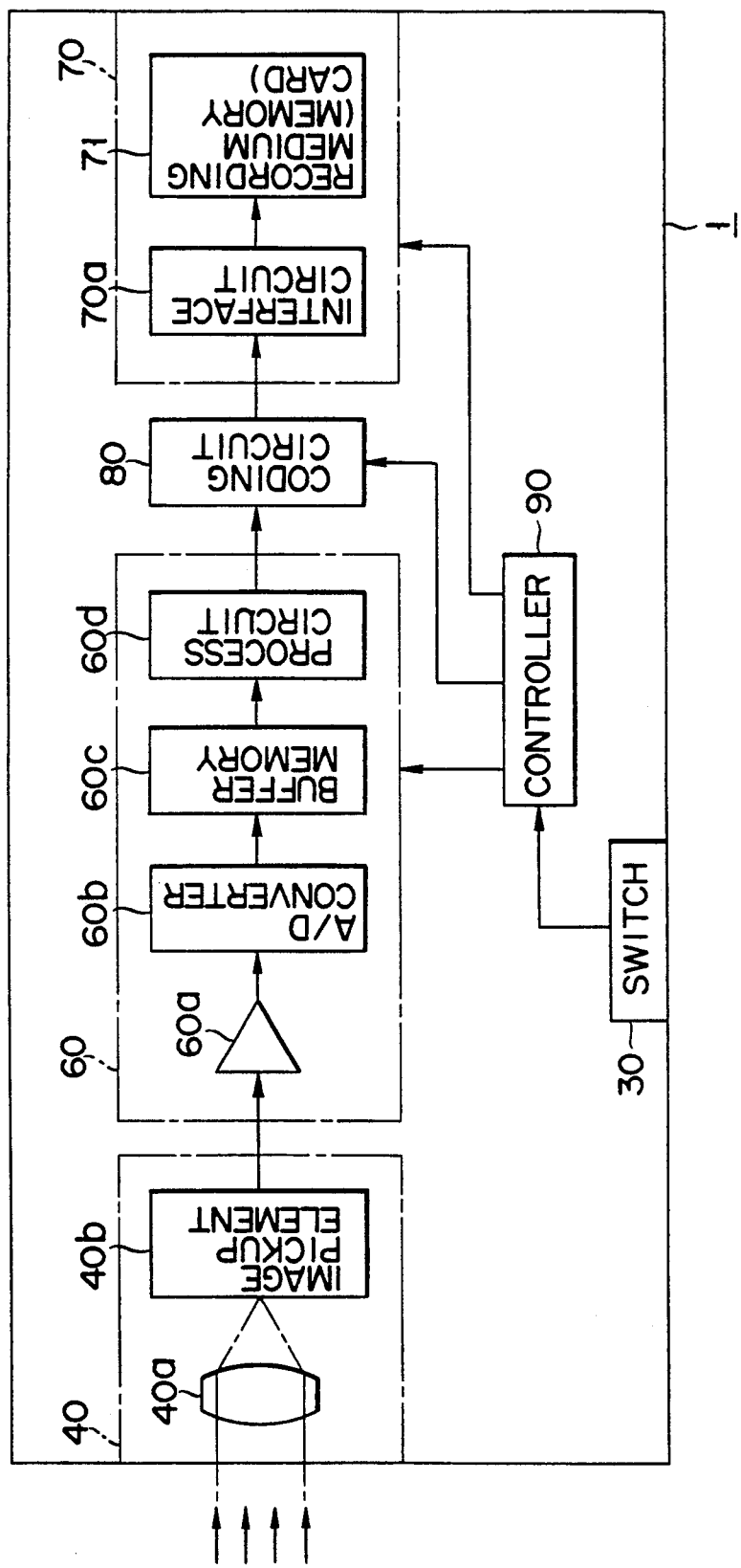
FIG. 7 is a block diagram showing a state in which a coding apparatus of the present invention is applied to an electronic camera.

As shown in FIG. 7, an electronic camera main body 1 comprises a image pickup system 40 for picking up an image, a signal processor 60 for executing predetermined signal processing for an output from the image pickup system 40, a coding circuit 80, capable of executing preprocessing, linear coding, and entropy coding, for compression-coding an output from the signal processor 60 and supplying the coded output, a recording system 70 for recording image data coded by the coding circuit 80 and a quantization width (or information corresponding to the quantization width) in a recording medium (memory card) 71, a switch 30 for setting a desired data compression ratio, and a controller 90 for controlling the entire system.

The switch 30 for setting a compression ratio of an image is arranged on an operation portion of the electronic camera main body 1 and connected to the controller 90.

The image pickup system 40 includes a lens 40a for focusing an optimal image and an image pickup element 40b. The signal processor 60 includes an amplifier 60a for executing amplification and noise removal, an A/D converter 60b for converting an analog signal into a digital signal, a buffer memory 60c constituted by a RAM or the like, and a process circuit 60d for executing, e.g., color signal formation. The coding circuit 80 includes, e.g., an orthogonal transform circuit 4 for executing orthogonal transform such as DCT (Discrete Cosine Transform), a quantizing circuit 6 for executing linear quantization, and a Huffman coding circuit 8 for executing Huffman coding as entropy coding. The coding circuit 80 further includes a quantization width predicting circuit 12, an amount-of-codes calculator 14, an amount-of-codes assigning unit 20, a coding stop circuit 16, and a controller 18 for executing control processing in the coding circuit 80.

The recording system 70 is constituted by an interface circuit 70a and a memory card 71 incorporating an IC memory to be used as a recording medium. The memory card 71 can be loaded/unloaded with respect to the electronic camera main body 1. The controller 90 is realized by a microprocessor (MPU).

Figure 10:
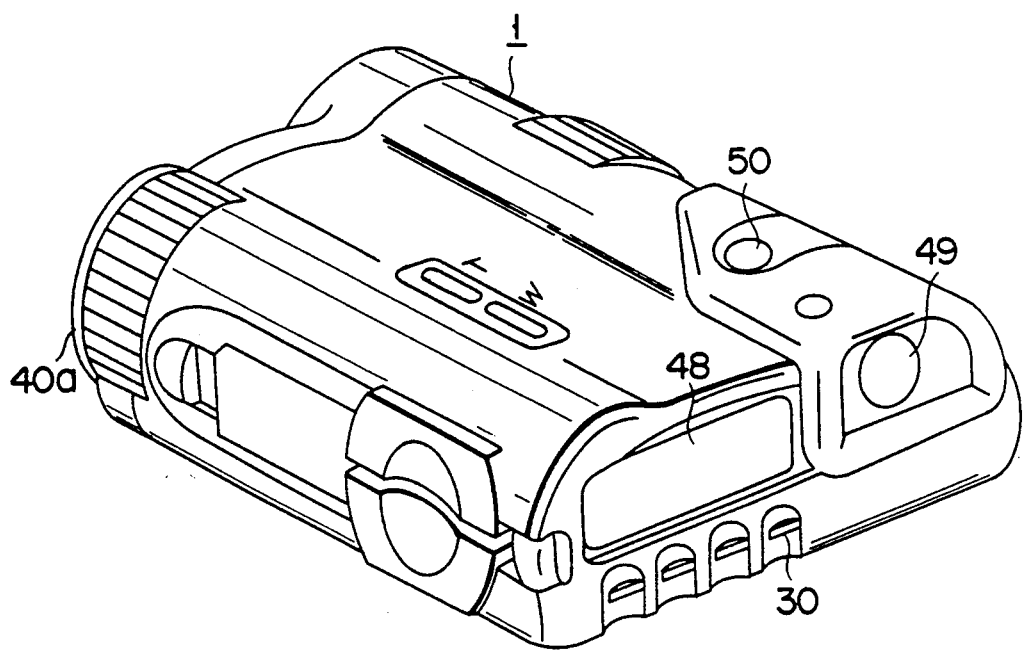
FIG. 10 is a perspective view showing an outer appearance of an electronic camera main body.

FIG. 10 is a perspective view showing an outer appearance of the electronic camera main body 1, in which a binocular-type electronic camera is illustrated. Referring to FIG. 10, reference numeral 48 denotes an LCD (liquid-crystal) display in an operation portion; and 30, a switch in the operation portion. This camera further includes a telephoto/wide switch, a shutter release button 50, and the like. Reference numeral 49 denotes a viewfinder. The LCD display 48 displays various values and states such as a photographic mode, a frame number, a date, and a time under the control of the controller 90. In the electronic camera of this embodiment, an image compression ratio can be set at a desired value by operating the switch 30 provided in the operation portion of the electronic camera main body 1. That is, a plurality of types of compression ratio information are set beforehand in the controller 90, and the controller 90 selects a suitable compression ratio on the basis of the value of a photographable number of images set by operating the switch 30 and the capacity of a mounted memory card (recording medium) and displays the value of the selected compression ratio as the number of images recordable in the memory card on the LCD display 48 of the operation portion. Each time a user depresses the switch 30, the controller 90 changes the value.

The user stops depressing the switch 30 when a desired value is displayed while monitoring the displayed changing value, and the controller 90 sets a compression ratio corresponding to the presently designated photographable number of images. That is, the controller 90 calculates a standard total amount of codes per image determined in accordance with the compression ratio and outputs the calculated amount as target-amount-of-codes set information to the coding circuit 80. In addition, when the shutter release button 50 as a trigger switch is depressed, a shutter function is activated to focus an image of an object to be photographed on the image pickup element 40b, and an electronic charge image is stored in the element 40b in correspondence with the formed image. Therefore, an image signal can be obtained from the image pickup element 40b by reading out and controlling the stored image. A series of these operations are also controlled by the controller 90.

The image pickup 40 shown in FIG. 7 includes the photographic lens 40a and the image pickup element 40b constituted by an image pickup device such as a CCD. The system 40 converts an optical image focused on the image pickup element 40b by the photographic lens 40a into an image signal and outputs the converted signal to the signal processor 60. The signal processor 60 including the amplifier 60a, the A/D converter 60b, the buffer memory 60c, and the process circuit 60d causes the process circuit 60d to separate the image signal obtained by the image pickup element 40b into color components Y, R-Y (to be referred to as Cr (chroma red) hereinafter), and B-Y (to be referred to as Cb (chroma blue) hereinafter) of color signals and executes, e.g., gamma correction or white balance processing.

Image data of the output image signal obtained by the image pickup system 40 and digital-converted by the A/C converter 60b is stored in the buffer memory 60c having a capacity of, e.g., one frame, read out to the process circuit 60d, and separated into a Y component as a luminance signal system and Cr and Cb components as a chroma (C; color difference signal) system. In order to execute statistical processing for the luminance-based signal first, for example, the image data stored in the buffer memory 60c is processed by the process circuit to obtain Y-component data of the image signal, and the obtained Y-component data is subjected to coding processing by the coding circuit 80. When the processing for the Y-component data is finished, the chroma-based Cr- and Cb-component data are processed by the process circuit and then coded.

The signal processor 60 has a blocking function and therefore can divide the image data (of one frame or one field) for the Y component and the Cr and Cb components read out from the buffer memory 60c and processed by the process circuit into blocks having a predetermined size. In this embodiment, the size of a block is 8×8 pixels. The block size, however, is not limited to 8×8 pixels but may be different between the Y and C (chroma-based) components.

In this embodiment, the luminance-based Y-component data is read out first and blocked. The blocked Y-component data is supplied to the processing system in the subsequent stage and subjected to statistical processing. When the statistical processing for the Y-component data is finished, in order to start statistical processing for the chroma-based Cr- and Cb-component data, the chroma-based Cr- and Cb-component data are read out and blocked. In this case, the Cr-component image data is completely blocked first, and then the Cb-component image data is blocked.

The coding circuit 80 is the same as that shown in FIG. 2 and a detailed description thereof will be omitted.

The recording system 70 shown in FIG. 7 includes the interface circuit 70a and the recording medium 71 detachably connected to the interface circuit 70a. Image data coded and output from the coding circuit 80 is recorded in the recording medium 71 via the interface circuit 70a.

An operation of the camera apparatus having the above arrangement will be described below. For better understanding of the principle of the entire system, however, a basic operation of the apparatus will be described first with reference to operational transition shown in FIG. 5. Before a user of the camera starts photographing, he or she operates the switch 30 to set a desired photographable number of images. The controller 90 calculates an optimal amount of codes in accordance with the set photographable number of images and supplies the amount of codes as target-amount-of-codes set information to the coding circuit 80.

In this manner, the photographable number of images is set.

When photographing is performed, an image of an object to be photographed is focused as an optical image on the image pickup element 40b arranged behind the photographic lens 40a. The image pickup element 40b converts the focused optical image into an image signal and outputs the signal to the signal processor 60. In the signal processor 60, the image signal is amplified by the amplifier 60a, A/D-converted by the A/D converter 60b, and temporarily stored in the buffer memory 60c. Thereafter, the image signal is read out from the buffer memory 60c and subjected to processing such as band compensation and color signal formation by the process circuit 60d in the signal processor 60.

Since coding processing is executed in the subsequent stage in an order of the Y (luminance) signal and the Cr and Cb (color difference) signals, the color signal formation is performed accordingly. That is, the image signal is blocked by the 8×8 matrix and read out, and the process circuit separates different color component signals from the block image signal data in an order of the Y component, the Cr component (R-Y component), and the Cb component (B-Y component) and executes gamma correction, white balance processing, and the like.

The image signal data of each color component in the block image signal of the 8×8 matrix separated by the process circuit 60d is input to the coding circuit 80. As a result, the image data of one frame (or one field) is divided into blocks having the above predetermined size and sequentially input to the coding circuit 80. Note that the image signals of the respective color components processed by the process circuit 60d may be stored in the buffer memory in units of the Y, Cr, and Cb components and read out and used in the subsequent processing.

In this embodiment, the signal processor 60 outputs a Y component (luminance component) of image signal data of one image, and processing (statistical processing) is executed for the Y component in the subsequent stage. Thereafter, Cr-component image data is blocked and subjected to the statistical processing in the subsequent stage, and then Cb-component image data is blocked and subjected to the statistical processing in the subsequent stage.

The coding circuit 80 supplies the input data from the signal processor 60 to the orthogonal transform circuit 4 (FIG. 2), and the subsequent processing is the same as described above.

When coding of the image data is started, a target total amount of codes is set in the controller 18 of the coding circuit 80. That is, when a user sets a desired photographable number of images by operating the switch 30, the controller 90 selects an optimal amount of codes in accordance with the set photographable number of images and supplies the optimal amount as target-amount-of-codes information to the coding circuit 80. Note that a standard photographable number of images is set in an initial state.

In the manner as described above, the coded data controlled to have the target amount of codes is sequentially output to the recording system 70 via the code output circuit 10 and recorded in the system.

Reproduction of the compression-coded image data recorded in the recording medium 71 by the recording system 70 will be described below.

Figure 8:
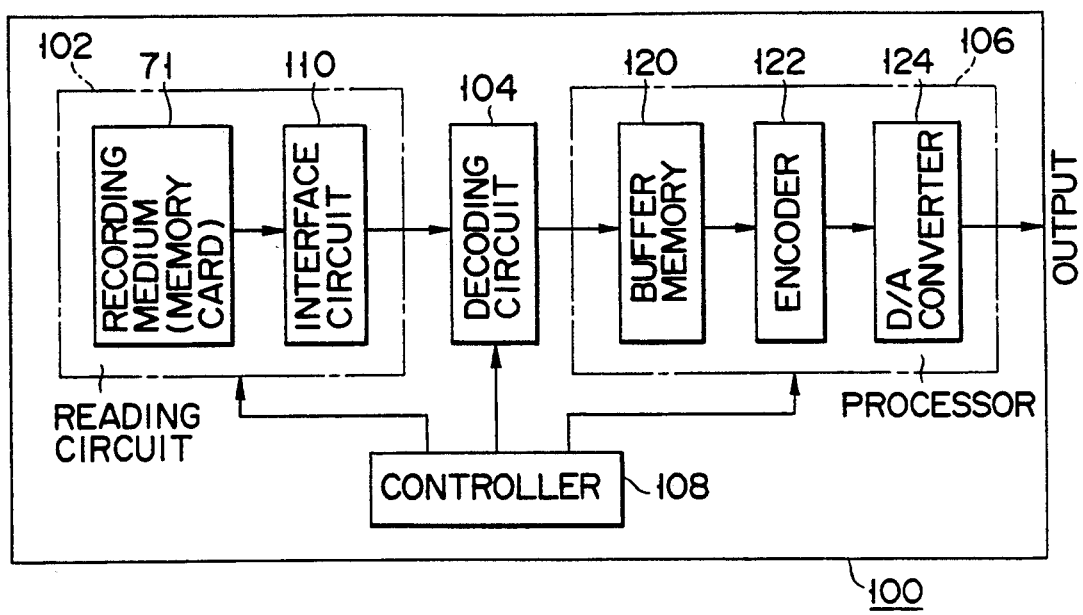
FIGS. 8 and 9 are block diagrams showing arrangements of a reproduction apparatus.

FIG. 8 shows an arrangement of a reproduction apparatus. Referring to FIG. 8, reference numeral 100 denotes a reproduction apparatus main body including a reading circuit 102, a decoding circuit 104, a processor 106, and a controller 108. The reading circuit 102 allows loading/unloading of the recording medium 71 and reads out the contents of the medium 71 via an interface circuit 110.

Figure 9:
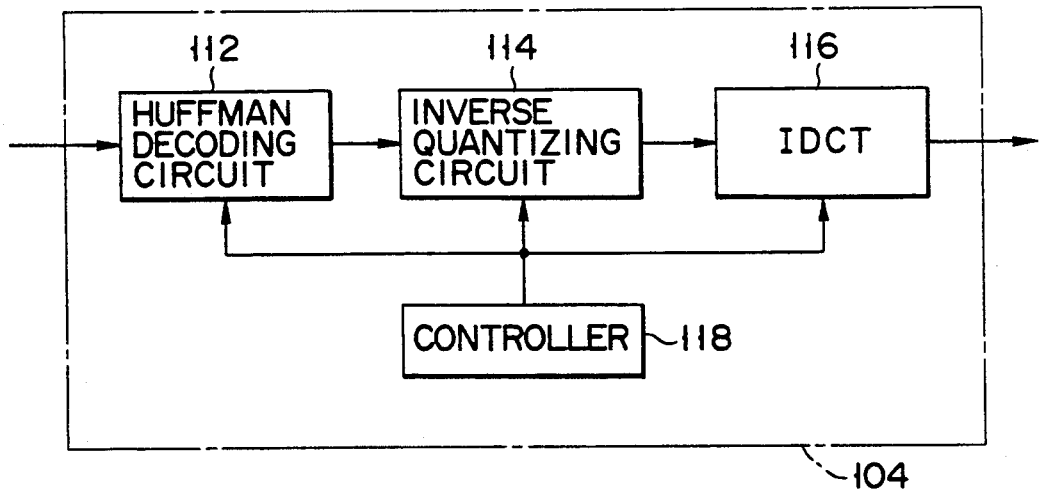

The decoding circuit 104 has a function block as shown in FIG. 9. Referring to FIG. 9, reference numeral 112 denotes a Huffman decoding circuit for decoding Huffman-coded data; 114, an inverse quantizing circuit for executing inverse quantization for data obtained by the Huffman decoding on the basis of input quantization width information read out from the recording medium 71; 116, an IDCT (inverse IDCT transform) circuit for executing inverse DCT transform for the inverse-quantized data to output image signal data; and 118, a controller for controlling these circuits.

The processor 106 includes a buffer memory 120, an encoder 122, and a D/A converter 124. The buffer memory 120 temporarily stores the video signal data output from the decoding circuit 104. The encoder 122 converts the image signal data read out from the buffer memory 120 into a video signal of an NTSC system. The D/A converter 124 analog-converts the NTSC system video signal into a video signal for a television.

The controller 108 controls the entire reproduction apparatus main body 100. That is, the controller 108 controls the reading circuit 102 to read out information of a quantization width used upon coding and sets the quantization width information read out from the recording medium 71 in the inverse quantizing circuit 114 of the decoding circuit 104. Subsequently, the controller 108 so controls the reading circuit 102 as to read out compression-coded video signal data from the recording medium 71. In addition, the reproduction apparatus main body 100 further includes a frame-feed switch (not shown) and therefore can reproduce an image in a frame position designated by the switch. This processing is also controlled by the controller 108.

An operation of the reproduction apparatus having the above arrangement will be described below. When the recording medium (memory card) 71 recording compression-coded video signal data is mounted in the reading circuit 102 of the reproduction apparatus main body 100, the controller 108 so controls the reading circuit 102 as to read out information of a quantization width used upon coding. As a result, the quantization width information upon coding is read out from the recording medium 71 and set in the inverse quantizing circuit 114 of the decoding circuit 104. Subsequently, since the controller 108 controls the reading circuit 102 so as to read out the video signal from the recording medium 71, the reading circuit 102 sequentially reads out the video signal from the recording medium 71 and supplies the readout signal to the decoding circuit 104. In the decoding circuit 104, the Huffman decoding circuit 112 decodes a Huffman code to obtain a quantization coefficient. The obtained quantization coefficient is inversely quantized by the inverse quantizing circuit 114. This inverse quantization is executed by using the preset quantization width information described above.

The transform coefficient obtained by the inverse quantization is subjected to inverse DCT transform in units of blocks by the IDCT circuit 116 and decoded into the original video signal. In this manner, video signals are sequentially decoded in an order of Y, Cr, and Cb, output from the decoding circuit 104, and written in the buffer memory 120 of the processor 106. When writing of video signal data of one screen is finished, the video signal data is read out from the buffer memory 120 in a scanning order of an ordinary TV signal and converted into a video signal of an NTSC system. The NTSC system video signal is converted into an analog signal and output by the D/A converter 124. When the obtained video signal is input to a TV monitor, the image reproduced as a TV image can be monitored. When the video signal is supplied to a printing apparatus such as a video printer and printed as a hard copy, the image can be monitored like a photograph.

As described above, a user can set a desired photographable number of images in the camera apparatus of this embodiment, and the camera automatically sets a compression ratio corresponding to the set photographable number of images. Photographed image data of one screen is quantized by using a temporary quantization width determined in accordance with the set compression ratio and is entropy-coded. An optimal quantization width is predicted on the basis of an amount of codes of the photographed image data of one screen obtained by the entropy coding, and the photographed image data of one screen is quantized with the predicted optimal quantization width and entropy-coded. In reproduction of the coded video signal, decoding is executed by using the above optimal quantization width used in photographing. Therefore, coding at a desired compression ratio can be realized by using single common hardware without providing independent hardware for each compression ratio. Similarly, decoding of the image data coded at a desired compression ratio can be realized by single common hardware without providing independent hardware for each compression ratio. A a result, the manufacturing cost and the size of the apparatus can be reduced.

The above embodiment in which the coding apparatus according to the present invention is applied to an electronic camera adopts a two-pass system which completes the coding processing by two steps of the first an second passes. The present invention, however, is not limited to the above embodiment but can realize practically satisfactory compression ratio control in a system for executing coding by a single pass by using a quantization width set in accordance with a compression ratio. In addition, the recording medium is not limited to a memory card but may be a floppy disk, an optical disk, a magnetic tape, or the like. Although the camera and the reproduction apparatus are independent units in the above embodiment, a single unit may have functions of both the camera and the reproduction apparatus. Furthermore, although the value of a quantization width is recorded in the recording medium in the above embodiment, the quantization width value may be converted or coded and then recorded in the recording medium. The preprocessing coding may be KL transform or DPCM transform. The entropy coding may be arithmetic coding or run-length coding.

According to the present invention, a final target amount of codes of an image can be automatically changed by setting a photographable number of images and the like. When the final target amount of codes is set, a quantization width coefficient $\alpha$ required to obtain the target amount of codes is calculated on the basis of the target amount of codes and used in coding. Since, therefore, an amount of codes close to the target amount of codes can be initially obtained, a substantially optimal value can be obtained by a single pass. This processing is already described above and therefore will be omitted.

In addition, in the above embodiment, information of a total amount of codes is given by compression ratio information, a quantization width coefficient capable of obtaining a quantization width corresponding to the total amount of codes is predicted, and quantization is executed by a quantization width based on the predicted quantization width coefficient. A relationship of the quantization width with respect to the compression ratio information, however, may be calculated and stored beforehand in a memory or the like in the form of a table so that the quantization width information (i.e., the quantization width coefficient or the quantization width value) can be output directly from the compression ratio information. In this case, when information corresponding to a desired compression ratio is input, information of a quantization width which is uniquely determined in accordance with the input compression ratio information can be read out and output. Therefore, since an optimal quantization width can be immediately set, a quantizing circuit can immediately quantize image signal data by using the set quantization width.

According to the above arrangement, information of an optimal quantization width can be obtained by only reading out information of optimal quantization widths, corresponding to various types of compression ratios and stored beforehand in a memory or the like, in correspondence with input compression ratio information. Therefore, when coding is to be executed within the range of a target amount of codes, the coding processing can be performed within a very short time period, and the arrangement of hardware can be simplified.

According to the present invention, even when a target amount of codes is changed, an optimal quantization width for making the amount of generated codes approach the target amount of codes can be obtained. Since quantization is executed by using this quantization width, an amount of codes close to the target amount of codes can be obtained even in a system in which coding is finished by executing processing only once (one-pass system). In a two-pass system in which the amount of codes is controlled by executing coding processing twice, since a quantization width is corrected on the basis of the amount of codes obtained by using a temporary quantization width used in the first coding processing (statistical processing), prediction precision of an optimal quantization width can be effectively improved, and coding can be executed with high image quality. In addition, in an n-pass system in which coding processing and prediction of an optimal quantization width are repeatedly executed until a total amount of codes close enough to and falling within the range of the target amount of codes is obtained, the number of repetition times of coding processing (statistical processing) in the first pass executed until an optimal quantization width capable of making the amount of codes fall within the range of the target amount of codes is found (i.e., until a quantization width is converged to an optimal value) is decreased. As a result, a processing time required for coding can be effectively shortened.

A further embodiment of the invention will be explained. This embodiment is directed to a technique of automatically setting the quality of an image. Specifically, in the further embodiment, coding is performed by the use of temporary quantization widths, and optimal image quality is determined from the amount of codes generated by the coding.

In general, if coding is performed by the use of the same quantization width, an image generating a large amount of codes has lots of high frequency components. These high frequency components are inevitably removed by subjecting the image to high compression to have a small amount of codes, thereby deteriorating the quality of the image. On the other hand, the quality of an image generating a small amount of codes is not so damaged even when it is compressed to a high degree. This fact is utilized in the further embodiment, thereby enabling an optimal compression rate to be automatically obtained in units of one screen.

Figure 11:
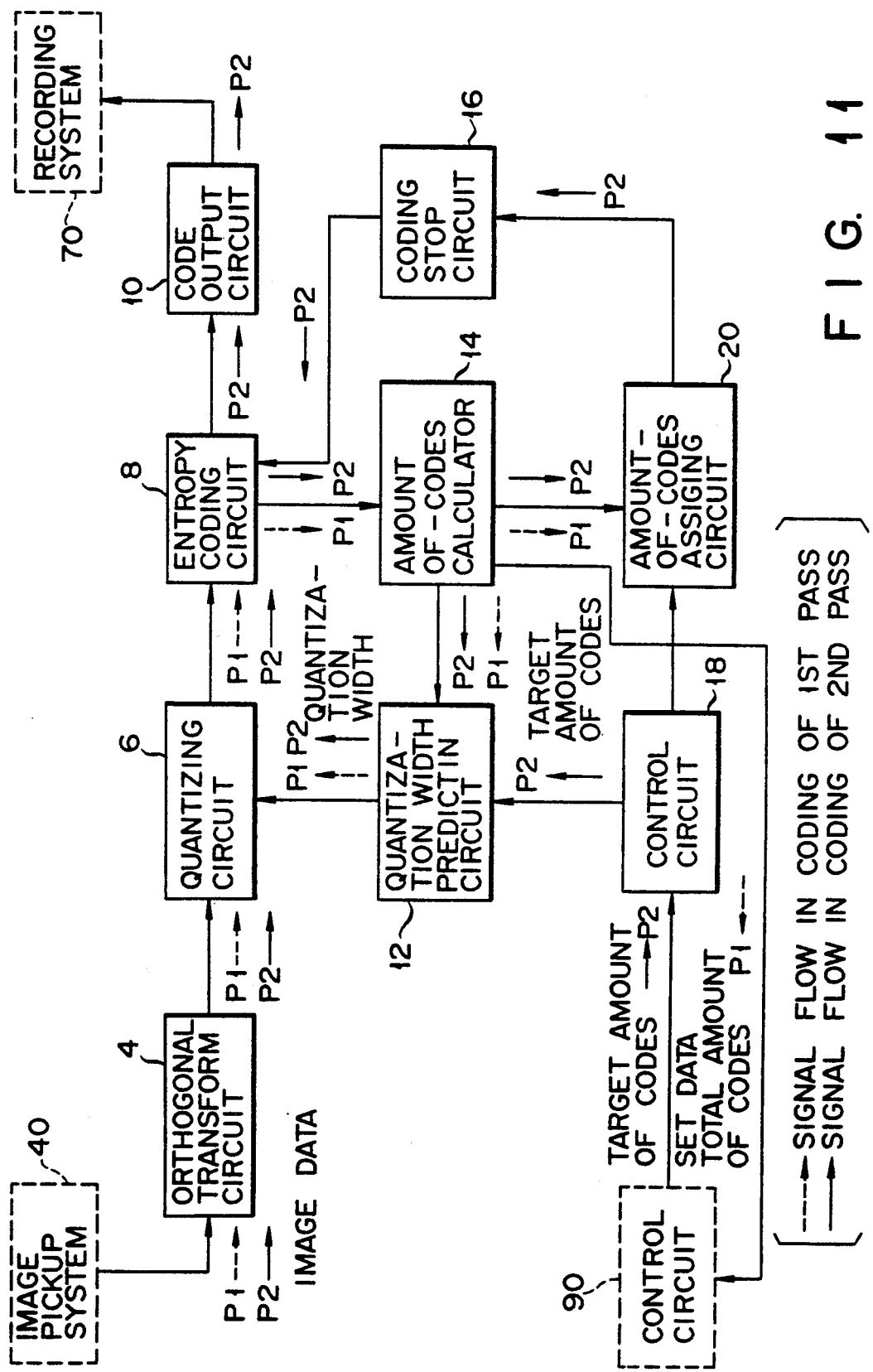
FIG. 11 shows a coding circuit according to a further embodiment of the present invention.

FIG. 11 shows a coding circuit according to the further embodiment, in which the same reference numerals indicate the same elements as those in any one of the other embodiments, and therefore explanation of these elements is omitted.

In the further embodiment, blocking is performed with respect to image data (digitalized image data) after photographing of an image, and then respective blocks obtained are serially subjected to DCT, thereby obtaining coefficients for respective frequency components. The obtained DCT coefficient data are quantized by the use of temporary quantization width coefficients $\alpha$ provided for respective frequency components, in the order from the lowest frequency component, and then are subjected to Huffman coding. Subsequently, an optimal target amount of codes is determined from the total amount of codes generated by the coding and the amount of codes of each block, and the target code amount is divided in accordance with the amount of codes of each block, thereby determining an assignment amount of codes for each block. Thereafter, optimal quantization widths for respective frequency components are determined from the total amount and target amount of codes. Then, blocking is again performed with respect to image data after photographing of an image, and then respective blocks obtained are serially subjected to DCT, thereby obtaining coefficients for respective frequency components. The obtained DCT coefficient data are quantized in the order from the lowest frequency component, by the use of the determined optimal quantization width coefficients $\alpha$ for respective frequency components, and are then subjected to Huffman coding. The amount of codes of each block generated by Huffman coding is recorded unless it exceeds the assignment amount set in a feedback manner, whereas coding is stopped if the amount of the generated codes exceeds the same.

A control circuit 90 has a function of performing the above-described processing. The circuit 90 determines an optimal target amount of codes for an image, being subjected to statistical processing, on the basis of the total code amount during the statistical processing (i.e., the total amount of codes generated by processing in a first path). The circuit 90 then supplies the target code amount to a control circuit 18, which, in turn, controls a quantization width-predicting circuit 12 to predict optimal quantization width coefficients $\alpha$ for respective frequency components, on the basis of the determined target code amount and total code amount during the statistical processing. The circuit 12 further determines optimal quantization widths for respective frequency components by correction using the predicted optimal quantization width coefficients $\alpha$, and then supplies the optimal quantization widths to a quantization circuit 6. The circuit 6 in turn quantizes image data (DCT conversion value) of each block by the use of the optimal quantization widths set for respective frequency components.

The quantization output is supplied to an entropy coding circuit 8, where coding is performed in each block so as to generate codes of an amount falling within a range of an assignment amount of less. At this time, if the amount of codes exceeds the assignment amount, coding is stopped.

In the apparatus constructed as above, after photographing, an image signal is output from an image sensing element in an image sensing system 40, then is converted to a digital signal in a signal processing circuit 60, and is read out in units of one block consisting of $8 \times 8$ pixels. The digitalized image data read out in units of one block is input to a coding circuit 80. The image data of each block is subjected to DCT by an orthogonal conversion circuit 4 incorporated in the coding circuit 80, thereby obtaining DCT coefficients for respective frequency components. The DCT coefficients are subjected by a quantization circuit 6 in the coding circuit 80, to linear quantization using the temporary quantization widths for respective frequency components.

The quantized coefficients are subjected to Huffman coding by the entropy coding circuit 8 in the coding circuit 80.

A code amount-calculating circuit 14 in the coding circuit 80 calculates the amount of codes of coded image data on the basis of the output of the entropy coding circuit 8, and outputs it to a code amount-assigning circuit 20 in the coding circuit 80. The circuit 20 stores the amount of codes generated in each block.

The above processing is serially performed under the control of the control circuit 90 in units of one block. Each time processing of blocks corresponding to one screen has been completed, the total amount of codes generated at this time is transmitted from the calculating circuit 14 to the quantization amount-predicting circuit 12 and control circuit 90.

The control circuit 90 determines an optimal target code amount for an image being processed from the total code amount, and sets it in the control circuit 18.

Thereafter, the signal processing circuit 60 performs coding in a second path under the control of the control circuit 90. This processing starts by again reading image data out of a buffer memory 60c, performing blocking for the data, and inputting it to the coding circuit 80. In the circuit 80, the input data is supplied to the orthogonal conversion circuit 4, where DCT is performed, thereby obtaining DCT coefficients. These coefficients are supplied to the quantization circuit 6.

On the other hand, in the quantization width-predicting circuit 12 in the coding circuit 80, optimal quantization width coefficients $\alpha$ for the respective frequency components are predicted from the total amount of codes obtained by the first path coding and the target code amount, and are output to the quantization circuit 6. The code amount-assigning circuit 20 determines an assignment code amount for each block by means of proportional distribution, etc., on the basis of the stored code amount of each block and the target code amount from the control circuit 90, and stores it.

In the quantization circuit 6, the DCT conversion coefficients output from the orthogonal conversion circuit 4 are subjected to linear quantization using corrected quantization widths obtained by weighing newly assigned quantization width coefficients α for the respective frequency components by respective given values supplied from a quantization matrix, in the order from the lowest frequency area.

The linear quantized coefficients are subjected to Huffman coding in the entropy coding circuit 8. The amount of codes generated at the coding in the second path is compared with the assignment code amount of each block obtained at the temporary coding (=statistic coding in the first path) and stored in the code amount-assigning circuit 20. If the code amount exceeds the assignment code amount, a coding interrupting circuit 16 instructs the entropy coding circuit 8 to stop coding. Thus, coding is stopped in a block in which coding is being performed. The coding interrupting instruction is also supplied to the control circuit 90, and the circuit 90 controls so that the same processing as above will be performed in the next block.

The coded data whose amount is controlled to a target amount in the above-described manner are serially output to and stored in a recording system 70 via a code output circuit 10.

As is described above, in the first coding in the first path, i.e., in the coding as statistic processing using temporary quantization width coefficients, variable-length coding is performed using temporary quantization width coefficients determined from orthogonal conversion values of each block for respective frequency components; the total code amount of image data of one screen is obtained using temporary quantization width coefficients; a target code amount is determined from the total code amount so as to obtain an optimal compression rate and thereby obtain a high quality image; and optimal quantization width coefficients for respective frequency components are determined from the target code amount and the amount of codes generated at the statistic processing.

Further, in the second coding in the second path, the orthogonal conversion values of each block are coded by use of the optimal quantization width coefficients for the respective frequency components; coding is continued as long as the code amount of each block is less than a value assigned thereto; and if the code amount exceeds the assignment value, coding in the block is stopped, and the next block is subjected to coding.

By virtue of the above structure, a compression rate appropriate for each image can be automatically determined.

In summary, since the code amount output from the coding circuit is used as a reference value for selecting a compression rate, no particular devices are needed for doing so. Moreover, the same hardware can provided various target code amounts.

The apparatus of this embodiment may be modified to have such a function similar to that of the apparatuses of the foregoing embodiments that quantization is performed using quantization matrices for a Y (luminance) component and a C (chroma-based) component (the C component can be further divided into Cr and Cb components). In addition, it is most preferable to employ such a system as can select an optimal value from several target amounts set beforehand in consideration of the amount of codes generated, since there is a standard of minimum possible recording pages in a recording medium.

The present invention is not limited to the embodiments described above and illustrated in the accompanying drawings but can be variously modified without departing from the spirit and scope of the invention. For example, the present invention can be applied to compression coding for not only a still image but also various types of other images such as a motion image.

As has been described above in detail, according to the present invention, there is provided an image data coding apparatus and coding method which can make the amount of codes approach a target amount of codes even when the target amount of codes is changed and can obtain the highest image quality within the range of the target amount of codes.

As has been described above, according to the present invention, an image can be compression-coded at a desired compression ratio, and the compression coding can be realized by single common hardware without providing independent hardware for each compression ratio even when a compression ratio is changed. Similarly, in a reproduction system, reproduction processing can be realized by single common hardware without providing independent hardware for each compression ratio. In addition, since an amount of codes compressed to be close to a target amount of codes can be obtained in correspondence with the target amount of codes, the highest image quality falling within the range of the target amount of codes can be obtained. That is, the present invention can provide an electronic camera system which can eliminate degradation in image quality and realize cost reduction and a small size in hardware.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image data coding apparatus comprising:
   preprocessing means for executing preprocessing including compression for input image data in units of screen to generate a preprocessed output;
   quantizing means for quantizing the preprocessed output generated by said preprocessing means with a predetermined quantization width to generate a quantized output;
   variable-length coding means for executing variable-length for the quantized output generated by said quantizing means;
   input means for inputting a desired image compression ratio information;
   target-amount-of codes output means for outputting information concerning a target amount of codes corresponding to one screen, calculated on the basis of said image compression ratio information; and
   quantization width predicting means for predicting a suitable quantization width on the basis of the information output from said target-amount-of-codes output means to supply information concerning the predicted quantization width to said quantizing means; and wherein said quantizing means quantizes the preprocessed output generated by said preprocessing means with the predicted quantization width generated by said quantization width predicting means.

2. An apparatus according to claim 1, wherein said preprocessing means includes orthogonal transform means for executing orthogonal transform for the input image data.

3. An apparatus according to claim 1, wherein said preprocessing means includes predictive coding means for executing predictive coding for the input image data.

4. An apparatus according to claim 1, wherein said compression ratio information is a compression ratio.

5. An apparatus according to claim 1, wherein said compression ratio information is a photographable number.

6. An image data coding apparatus comprising:
preprocessing means for executing preprocessing including compression for input image data in units of screens to generate a preprocessed output;
quantizing means for quantizing the preprocessed output generated by said preprocessing means with a predetermined quantization width to generate a quantized output;
variable-length coding means for executing variable-length coding for the quantized output generated by said quantizing means to generate a coded output;
calculating means for calculating an amount of codes in units of screens on the basis of the coded output generated by said variable-length coding means to output a calculated amount of codes;
control means for outputting a target amount of codes corresponding to one screen, a first command for executing the preprocessing, and a second command for executing the variable-length coding after the preprocessing is finished; and
quantization width predicting means for, upon reception of the first command from said control means, predicting a suitable quantization width on the basis of the target amount of codes from said control means and supplying information concerning a first quantization width to said quantizing means, and upon reception of the second command from said control means, correcting the first quantization width to cause it to fall within the range of the target amount of codes from said control means and supplying information concerning a second quantization width obtained by the correction to said quantizing means,
wherein said quantizing means quantizes the preprocessed output generated by said preprocessing means on the basis of the second quantization width.

7. An apparatus according to claim 6, wherein said preprocessing means includes orthogonal transform means for executing orthogonal transform for the input image data.

8. An apparatus according to claim 6, wherein said preprocessing means includes predictive coding means for executing predictive coding for the input image data.

9. An image data coding apparatus comprising:
preprocessing means for dividing input image data in units of screens into blocks and executing preprocessing including compression for image data of each block to generate a preprocessed output;
quantizing means for quantizing the preprocessed output generated by said preprocessing means with a predetermined quantization width to generate a quantized output;
variable-length coding means for executing variable-length coding for the quantized output generated by said quantizing means to generate a coded output;
calculating means for calculating an amount of codes in units of screens on the basis of the coded output generated by said variable-length coding means to output a calculated amount of codes;
control means for outputting a target amount of codes corresponding to one screen, a first command for executing the preprocessing, and a second command for executing the variable-length coding after the preprocessing is finished;
quantization width predicting means for, upon reception of the first command from said control means, predicting a suitable quantization width on the basis of the target amount of codes from said control means and supplying information concerning a first quantization width to said quantizing means, and upon reception of the second command from said control means, correcting the first quantization width to cause it to fall within the range of the target amount of codes from said control means and supplying information concerning a second quantization width obtained by the correction to said quantizing means;
assigned-amount-of-codes calculating means for calculating an assigned amount of codes to be assigned to each block on the basis of the calculated amount of codes from said calculating means and the target amount of codes from said control means during execution of the preprocessing; and
coding stop means for outputting a stop command for stopping coding of a block executed by said variable-length coding means when the calculated amount of codes calculated by said calculating means for the block reaches the assigned amount of codes assigned to the block during execution of the variable-length coding,
wherein said quantizing means quantizes the preprocessed output generated by said preprocessing means by the second quantization width output from said quantization width predicting means, and said variable-length coding means stops the variable-length coding for a block presently being processed each time said variable-length coding means receives the stop command from said coding stop means.

10. An apparatus according to claim 9, wherein said preprocessing means includes orthogonal transform means for executing orthogonal transform for the input image data.

11. An image data coding apparatus comprising:
preprocessing means for executing preprocessing including compression for input image data in units of screens to generate a preprocessed output;
quantizing means for quantizing the preprocessed output generated by said preprocessing means with a predetermined quantization width to generate a quantized output;
variable-length coding means for executing variable-length coding for the quantized output generated by said quantizing means to generate a coded output;

calculating means for calculating an amount of codes in units of screens on the basis of the coded output generated by said variable-length coding means to output a calculated amount of codes;

control means for outputting a first command for obtaining an optimal quantization width, checking on the basis of the calculated amount of codes from said calculating means whether the command is to be output again, and outputting a second command for executing the variable-length coding when the optimal quantization width is finally obtained, said control means further generating a target amount of codes corresponding to one screen; and quantization width predicting means for, upon reception of the first command, predicting a quantization width corresponding to the target amount of codes from said control means and supplying information concerning a first quantization width to said quantizing means, correcting the first quantization width to cause it to fall within the range of the target amount of codes from said control means and supplying a second quantization width obtained by the correction to said quantizing means, and, upon reception of the second command, supplying information concerning the optimal quantization width to said quantizing means.

12. An electronic camera apparatus comprising:

an image pickup system for outputting image data concerning an object to be photographed;

preprocessing means for executing preprocessing including compression for the image data output in units of screens from said image pickup system to generate a preprocessed output;

quantizing means for quantizing the preprocessed output generated by said preprocessing means with a predetermined quantization width to generate a quantized output;

variable-length coding means for executing variable-length coding for the quantized output generated by said quantizing means;

recording means for recording the coded output generated by said variable-length coding means in a recording medium so that the recorded data can be read out;

target-amount-of-codes output means for outputting information concerning a target amount of codes corresponding to one screen; and quantization width predicting means for predicting a suitable quantization width on the basis of the information output from said target-amount-of-codes output means to supply information concerning the predicted quantization width to said quantizing means, wherein said quantizing means quantizes the preprocessed output generated by said preprocessing means with the predicted quantization width generated by said quantization width predicting means, and said recording means records the information concerning the predicted quantization width from said quantization width predicting means in said recording medium so that the recorded information can be read out.

13. An electronic camera comprising:

an image pickup system for outputting image data concerning an object to be photographed;

preprocessing means for executing preprocessing including compression for the image data output in units of screens from said image pickup system to generate a preprocessed output;

quantizing means for quantizing the preprocessed output generated by said preprocessing means with a predetermined quantization width to generate a quantized output;

variable-length coding means for executing variable-length coding for the quantized output generated by said quantizing means to generate a coded output;

recording means for recording the coded output generated by said variable-length coding means in a recording medium so that the recorded data can be read out;

calculating means for calculating an amount of codes in units of screens on the basis of the coded output generated by said variable-length coding means to output a calculated amount of codes;

control means for outputting a target amount of codes corresponding to one screen, a first command for executing the preprocessing, and a second command for executing the variable-length coding after the preprocessing is finished; and quantization width predicting means for, upon reception of the first command from said control means, predicting a suitable quantization width on the basis of the target amount of codes from said control means and supplying information concerning a first quantization width to said quantizing means, and, upon reception of the second command from said control means, correcting the first quantization width to cause it to fall within the range of the target amount of codes from said control means and supplying information concerning a second quantization width obtained by the correction to said quantizing means, wherein said quantizing means quantizes the preprocessed output generated by said preprocessing means on the basis of the second quantization width, and said recording means records the information concerning the predicted quantization width from said quantization width predicting means in said recording medium so that the recorded information can be read out.

14. An electronic camera comprising:

an image pickup system for outputting image data concerning an object to be photographed;

preprocessing means for dividing the image data output in units of screens from said image pickup system into blocks and executing preprocessing including compression for image data of each block to generate a preprocessed output;

quantizing means for quantizing the preprocessed output generated by said preprocessing means with a predetermined quantization width to generate a quantized output;

variable-length coding means for executing variable-length coding for the quantized output generated by said quantizing means to generate a coded output;

recording means for recording the coded output generated by said variable-length coding means in a recording medium so that the recorded data can be read out;

calculating means for calculating an amount of codes in units of screens on the basis of the coded output generated by said variable-length coding means to output a calculated amount of codes;

control means for outputting a target amount of codes corresponding to one screen, a first command for executing the preprocessing, and a second command for executing the variable-length coding after the preprocessing is finished;

quantization width predicting means for, upon reception of the first command from said control means, predicting a suitable quantization width on the basis of the target amount of codes from said control means and supplying information concerning a first quantization width to said quantizing means, and upon reception of the second command from said control means, correcting the first quantization width to cause it to fall within the range of the target amount of codes from said control means and supplying information concerning a second quantization width obtained by the correction to said quantizing means;

assigned-amount-of-codes calculating means for calculating an assigned amount of codes to be assigned to each block on the basis of the calculated amount of codes from said calculating means and the target amount of codes from said control means during execution of the preprocessing; and coding stop means for outputting a stop command for stopping coding of a block executed by said variable-length coding means when the calculated amount of codes calculated by said calculating means for the block reaches the assigned amount of codes assigned to the block during execution of the variable-length coding, wherein said quantizing means quantizes the preprocessed output generated by said preprocessing means by the second quantization width output from said variable-length coding means stops the variable-length coding for a block presently being processed each time said variable-length coding means receives the stop command from said coding stop means, and said recording means records the information concerning the predicted quantization width from said quantization width predicting means in said recording medium so that the recorded data can be read out.

15. An electronic camera comprising:

an image pickup system for outputting image data concerning an object to be photographed;

preprocessing means for executing preprocessing including compression for the image data output in units of screens from said image pickup system to generate a preprocessed output;

quantizing means for quantizing the preprocessed output generated by said preprocessing means with a predetermined quantization width to generate a quantized output;

variable-length coding means for executing variable-length coding for the quantized output generated by said quantizing means to generate a coded output;

recording means for recording the coded output generated by said variable-length coding means in a recording medium so that the recorded data can be read out;

calculating means for calculating an amount of codes in units of screens on the basis of the coded output generated by said variable-length coding means to output a calculated amount of codes;

control means for outputting a first command for obtaining an optimal quantization width, checking on the basis of the calculated amount of codes from said calculating means whether the command is to be output again, and outputting a second command for executing the variable-length coding when the optimal quantization width is finally obtained, said control means further generating a target amount of codes corresponding to one screen; and quantization width predicting means for, upon reception of the first command, predicting a quantization width corresponding to the target amount of codes from said control means and supplying information concerning a first quantization width to said quantizing means, correcting the first quantization width to cause it to fall within the range of the target amount of codes from said control means and supplying a second quantization width obtained by the correction to said quantizing means, and, upon reception of the second command, supplying information concerning the optimal quantization width to said quantizing means, wherein said recording means records the information concerning the predicted quantization width from said quantization width predicting means in said recording medium so that the recorded information can be read out.

16. An apparatus according to claim 6, wherein the control means includes means for determining, as the target amount of codes the code amount that provides an optimal compression rate on the basis of the calculated amount of codes generated by the calculating means in units of one screen, and for determining a quantization width for each frequency component on the basis of the target code amount and calculated code amount.

17. An apparatus according to claim 9, wherein the control means includes means for determining, as the target amount of codes the code amount that provides an optimal compression rate on the basis of the calculated amount of codes generated by the calculating means in units of one screen, and for determining a quantization width for each frequency component on the basis of the target code amount and calculated code amount.

18. An apparatus according to claim 11, wherein the control means includes means for determining, as the target amount of codes the code amount that provides an optimal compression rate on the basis of the calculated amount of codes generated by the calculating means in units of one screen, and for determining a quantization width for each frequency component on the basis of the target code amount and calculated code amount.

19. An electronic camera according to claim 13, wherein the control means includes means for determining, as the target amount of codes the code amount that provides an optimal compression rate on the basis of the calculated amount of codes generated by the calculating means in units of one screen, and for determining a quantization width for each frequency component on the basis of the target code amount and calculated code amount.

20. An electronic camera according to claim 14, wherein the control means includes means for determining, as the target amount of codes the code amount that provides an optimal compression rate on the basis of the calculated amount of codes generated by the calculating means in units of one screen, and for determining a quantization width for each frequency component on the basis of the target code amount and calculated code amount.

21. An electronic camera according to claim 15, wherein the control means includes means for determining, as the target amount of codes the code amount that provides an optimal compression rate on the basis of the calculated amount of codes generated by the calculating means in units of one screen, and for determining a quantization width for each frequency component on the basis of the target code amount and calculated code amount.

22. A coding method of dividing image data of one screen into blocks, executing preprocessing including image information compression for each block, quantizing the preprocessed data with a predetermined quantization width, and executing variable-length coding for the quantized data, said coding means comprising:

a first step of setting the qauntization width in correspondence with a target amount of codes concerning the image data of one screen;

a second step of calculating an amount of codes of each block and an amount of codes of one screen on the basis of data of each block subjected to preprocessing, quantizing with the quantization width set in said first step, and variable length coding;

a third state of assigning an amount of codes to each block based on the amount of codes of each block and the amount of codes of one screen calculated in said second step;

a fourth step of predicting a quantization width required for optimization; and a fifth step of executing preprocessing, quantizing with the quantization width predicted in said fourth step, and variable length coding for each block within a range of the amount of codes assigned to each block, by stopping the coding of higher frequency components.

23. A coding method of executing preprocessing including image information compression for image data of one screen, quantizing the preprocessed image data with a set quantization width, and executing variable-length coding for the quantized data, comprising:

the first step of obtaining a standard optimal quantization width determined in correspondence with a target amount of codes concerning the image data of one screen and setting the obtained optimal quantization width as a temporary quantization width;

the second step of calculating an amount of codes of one screen on the basis of the variable-length-coded image data;

the third step of predicting an optimal quantization width for converging the calculated amount of codes to the target amount of codes and setting the predicted optimal quantization width as a new set quantization width;

the fourth step of quantizing the preprocessed image data by using the new set quantization width to calculate an amount of codes of one screen again;

the fifth step of comparing the target amount of codes with the calculated amount of codes, setting the new quantization width as re-optimization processing if the calculated amount of codes is smaller than the target amount of codes and falls outside a predetermined allowable range, and quantizing the preprocessed image data by using the new set quantization width as final processing if the calculated amount of codes falls within the predetermined allowable range; and the sixth step of obtaining the variable-length-coded as target final image data if the quantization is the final processing.

* * * * *